US011520743B2

(12) United States Patent
Kapoor et al.

(10) Patent No.: US 11,520,743 B2
(45) Date of Patent: Dec. 6, 2022

(54) STORING COMPRESSION UNITS IN RELATIONAL TABLES

(71) Applicant: Oracle International Corporation, Redwood Shores, CA (US)

(72) Inventors: Vikram Kapoor, Cupertino, CA (US); Amit Ganesh, San Jose, CA (US); Jesse Kamp, Castro Valley, CA (US); Sachin Kulkarni, Sunnyvale, CA (US); Vineet Marwah, San Ramon, CA (US); Kam Shergill, Maidenhead (GB); Roger Macnicol, Hummelstown, PA (US); Manosiz Bhattacharyya, San Jose, CA (US)

(73) Assignee: Oracle International Corporation, Redwood Shores, CA (US)

( * ) Notice: Subject to any disclaimer, the term of this patent is extended or adjusted under 35 U.S.C. 154(b) by 1669 days.

(21) Appl. No.: 14/079,507

(22) Filed: Nov. 13, 2013

(65) Prior Publication Data

US 2014/0074805 A1    Mar. 13, 2014

Related U.S. Application Data

(63) Continuation of application No. 12/769,205, filed on Apr. 28, 2010, now Pat. No. 8,645,337, which is a
(Continued)

(51) Int. Cl.
*G06F 16/174* (2019.01)
*G06F 16/2455* (2019.01)
*G06F 16/901* (2019.01)

(52) U.S. Cl.
CPC .... *G06F 16/1744* (2019.01); *G06F 16/24561* (2019.01); *G06F 16/902* (2019.01)

(58) Field of Classification Search
CPC ........ G06F 17/30153; G06F 17/30501; G06F 17/30955
See application file for complete search history.

(56) References Cited

U.S. PATENT DOCUMENTS

| 5,255,356 A | 10/1993 | Michelman et al. |
| 5,263,145 A | 11/1993 | Brady et al. |

(Continued)

FOREIGN PATENT DOCUMENTS

WO    WO 2012/032184 A1    3/2012

OTHER PUBLICATIONS

U.S. Appl. No. 12/791,337, filed Jun. 1, 2010, Office Action, dated Feb. 11, 2014.

(Continued)

*Primary Examiner* — Mark D Featherstone
*Assistant Examiner* — Navneet Gmahl
(74) *Attorney, Agent, or Firm* — Hickman Becker Bingham Ledesma LLP

(57) ABSTRACT

A database server stores compressed units in data blocks of a database. A table (or data from a plurality of rows thereof) is first compressed into a "compression unit" using any of a wide variety of compression techniques. The compression unit is then stored in one or more data block rows across one or more data blocks. As a result, a single data block row may comprise compressed data for a plurality of table rows, as encoded within the compression unit. Storage of compression units in data blocks maintains compatibility with existing data block-based databases, thus allowing the use of compression units in preexisting databases without modification to the underlying format of the database. The compression units may, for example, co-exist with uncompressed tables. Various techniques allow a database server to
(Continued)

optimize access to data in the compression unit, so that the compression is virtually transparent to the user.

20 Claims, 17 Drawing Sheets

Related U.S. Application Data continuation-in-part of application No. 12/617,669, filed on Nov. 12, 2009, now Pat. No. 8,935,223.

(60) Provisional application No. 61/174,447, filed on Apr. 30, 2009.

(56) References Cited

U.S. PATENT DOCUMENTS

| | | | |
|---|---|---|---|
| 5,404,510 A | | 4/1995 | Smith et al. |
| 5,506,979 A | | 4/1996 | Menon |
| 5,794,228 A | * | 8/1998 | French .............. G06F 17/30324 |
| 5,794,229 A | * | 8/1998 | French .............. G06F 17/30324 |
| 5,995,080 A | | 11/1999 | Biro et al. |
| 6,334,123 B1 | | 12/2001 | Ross et al. |
| 6,973,452 B2 | * | 12/2005 | Metzger ............ G06F 17/30339 |
| 7,031,994 B2 | | 4/2006 | Lao et al. |
| 7,079,056 B2 | | 7/2006 | Weaver |
| 7,496,589 B1 | | 2/2009 | Jain et al. |
| 7,590,641 B1 | * | 9/2009 | Olson ............... G06F 17/30595 |
| 7,707,194 B2 | | 4/2010 | Bresch et al. |
| 8,032,499 B2 | | 10/2011 | Faerber et al. |
| 8,060,476 B1 | * | 11/2011 | Afonso ............... G06F 11/1451 |
| | | | 707/649 |
| 8,099,440 B2 | | 1/2012 | Johnson et al. |
| 8,203,972 B2 | | 6/2012 | Sauermann |
| 8,296,517 B2 | | 10/2012 | Potapov et al. |
| 8,392,382 B2 | | 3/2013 | Marwah et al. |
| 8,583,692 B2 | | 11/2013 | Ganesh et al. |
| 8,645,337 B2 | | 2/2014 | Kapoor et al. |
| 8,700,579 B2 | * | 4/2014 | Apanowicz ........ G06F 17/30448 |
| | | | 707/693 |
| 8,832,142 B2 | | 9/2014 | Marwah et al. |
| 2003/0028509 A1 | * | 2/2003 | Sah ................... G06F 17/30595 |
| 2004/0033803 A1 | | 2/2004 | Varonen et al. |
| 2004/0034616 A1 | * | 2/2004 | Witkowski ........ G06F 17/30592 |
| 2004/0117396 A1 | | 6/2004 | Avadhanam et al. |
| 2004/0139099 A1 | | 7/2004 | Weaver |
| 2005/0086267 A1 | | 4/2005 | Avadhanam et al. |
| 2005/0192941 A1 | | 9/2005 | Biedenstein |
| 2006/0074941 A1 | | 4/2006 | Flynn |
| 2006/0190425 A1 | | 8/2006 | Chang |
| 2007/0033354 A1 | * | 2/2007 | Burrows ........... G06F 17/30212 |
| | | | 711/156 |
| 2007/0061544 A1 | * | 3/2007 | Uppala ............. G06F 17/30315 |
| | | | 711/173 |
| 2007/0112736 A1 | | 5/2007 | Okamoto et al. |
| 2007/0143248 A1 | * | 6/2007 | Uppala ............. G06F 17/30442 |
| 2008/0162521 A1 | * | 7/2008 | Browning ........... G06F 21/6227 |
| 2008/0222136 A1 | * | 9/2008 | Yates ................. G06F 17/30321 |
| 2008/0281784 A1 | | 11/2008 | Zane et al. |
| 2008/0294676 A1 | | 11/2008 | Faerber et al. |
| 2008/0294863 A1 | * | 11/2008 | Faerber ............... H03M 7/3084 |
| | | | 711/170 |
| 2009/0019029 A1 | * | 1/2009 | Tommaney ........ G06F 17/30471 |
| 2009/0254516 A1 | * | 10/2009 | Meiyyappan ..... G06F 17/30492 |
| 2010/0030796 A1 | * | 2/2010 | Netz ................. G06F 17/30501 |
| | | | 707/756 |
| 2010/0088315 A1 | * | 4/2010 | Netz ................. G06F 17/30501 |
| | | | 707/737 |
| 2010/0161567 A1 | | 6/2010 | Makela |
| 2011/0016157 A1 | | 1/2011 | Bear et al. |
| 2011/0029569 A1 | | 2/2011 | Ganesh et al. |
| 2011/0040771 A1 | * | 2/2011 | Gilyadov ............. G06F 13/385 |
| | | | 707/754 |
| 2011/0047330 A1 | | 2/2011 | Potapov et al. |
| 2011/0066791 A1 | | 3/2011 | Goyal |
| 2011/0137940 A1 | | 6/2011 | Gradin et al. |
| 2011/0219020 A1 | | 9/2011 | Oks et al. |
| 2011/0295817 A1 | | 12/2011 | Chandrasekar et al. |
| 2012/0117038 A1 | | 5/2012 | Ganesh et al. |
| 2012/0173515 A1 | | 7/2012 | Chanho et al. |
| 2013/0036101 A1 | | 2/2013 | Marwah |
| 2014/0281247 A1 | | 9/2014 | Loaiza et al. |
| 2015/0032763 A1 | | 1/2015 | Marwah et al. |
| 2015/0381647 A1 | * | 12/2015 | Huang .................. G06F 21/552 |
| | | | 726/22 |

OTHER PUBLICATIONS

U.S. Appl. No. 12/871,824, filed Aug. 30, 2010, Notice of Allowance, dated Jan. 23, 2014.

U.S. Appl. No. 12/617,669, filed Nov. 12, 2009, Notice of Allowance, dated Mar. 13, 2014.

Dittrich et al., "Towards a One Size Fits All Database Architecture" Proceedings of the 5th Biennial Conference on Innovative Data Systems Research, dated Jan. 6, 2011, 4 pages.

U.S. Appl. No. 12/871,824, filed Aug. 30, 2010, Notice of Allowance, dated Apr. 30, 2014.

U.S. Appl. No. 12/617,669, filed Nov. 12, 2009, Notice of Allowance, dated Jul. 16, 2014.

U.S. Appl. No. 13/840,811, filed Mar. 15, 2013, Office Action, dated Jan. 12, 2015.

U.S. Appl. No. 12/791,337, filed Jun. 1, 2010, Examiners Answers, dated Dec. 26, 2014.

U.S. Appl. No. 13/840,811, filed Mar. 15, 2013, Interview Summary, dated Apr. 27, 2015.

W3Schools "SQL Update Statement", Wayback Machine darted Apr. 19, 2012, on the internet www.w3schools.com/sql/sql_update.asp>, 1 page.

U.S. Appl. No. 14/480,009, filed Sep. 8, 2014, Interview Summary, dated Oct. 14, 2015.

U.S. Appl. No. 14/480,009, filed Sep. 8, 2014, Final Office Action, dated Jan. 25, 2016.

U.S. Appl. No. 13/631,575, filed Sep. 28, 2012, Final Office Action, dated Jan. 12, 2016.

Ailamaki, Anastassia, et al., "Weaving Relations for Cache Performance," Proceedings of the 27th International Conference on Very Large Data Bases, Rome, Italy, Sep. 11-14, 2001, 14 pages.

Elmasri, et al., "Fundatmentals of Database Systems," Third Edition, Addison-Wesley Longman, Inc., Copyright © 2000, ISBN-0-8053-1755-4, pp. 32, 70, 118, 131-132, 134, 155-159, 170, 252-254, 558, 569-573, 591-592, and 789-790 (26 pgs).

U.S. Appl. No. 14/480,009, filed Sep. 8, 2014, Office Action, dated Jun. 30, 2016.

U.S. Appl. No. 13/631,575, filed Sep. 28, 2012, Interview Summary, dated Jun. 27, 2016.

U.S. Appl. No. 13/631,575, filed Jun. 28, 2012, Advisory Action, dated Jul. 15, 2016.

U.S. Appl. No. 13/631,575, filed Sep. 28, 2012, Decision on Appeal, Sep. 23, 2016.

U.S. Appl. No. 12/791,337, filed Jun. 1, 2010, Notice of Appeal Brief, Oct. 31, 2016.

Marwah, U.S. Appl. No. 14/480,009, filed Sep. 8, 2014, Notice of Allowance, dated Jan. 20, 2017.

Marwah U.S. Appl. No. 14/480,009, filed Sep. 8, 2014, Interview Summary, dated Jan. 9, 2017.

Warwah, U.S. Appl. No. 14/480,009, filed Sep. 8, 2014, Notice of Allowance, dated May 1, 2017.

Loaiza, U.S. Appl. No. 13/840,811, filed Mar. 15, 2013, Interview Summary Action, dated Mar. 30, 2017.

Schaffner et al., "A Hybrid Row-Column OLTP Database Architecture for Operational Reporting", dated Aug. 24, 2008, 14 pages.

Loaiza, U.S. Appl. No. 13/840,811, filed Mar. 15, 2013, Office Action, dated Jan. 10, 2018.

Loaiza, U.S. Appl. No. 13/840,811, filed Mar. 15, 2013, Final Office Action, dated Jul. 5, 2017.

Marwah, U.S. Appl. No. 14/480,009, filed Sep. 8, 2014, Supplemental Notice of Allowability, dated Jun. 20, 2018.

(56) References Cited

OTHER PUBLICATIONS

Loaiza, U.S. Appl. No. 13/840,811, filed Mar. 15, 2013, Notice of Allowance, dated Jun. 7, 2018.

* cited by examiner

```
┌─────────────────────────────────────────┐
│       COMPRESSION UNIT 1100             │
│  ┌───────────────────────────────────┐  │
│  │    UNCOMPRESSED SECTION 1102      │  │
│  │                                   │  │
│  │                                   │  │
│  └───────────────────────────────────┘  │
│  ┌───────────────────────────────────┐  │
│  │     COMPRESSED SECTION 1104       │  │
│  │                                   │  │
│  │                                   │  │
│  │                                   │  │
│  │                                   │  │
│  │                                   │  │
│  │                                   │  │
│  └───────────────────────────────────┘  │
└─────────────────────────────────────────┘
```

FIG. 11

TABLE 1200

|     | A         | B      | C         |
|-----|-----------|--------|-----------|
| R1  | IMAGE A1  | NAME1  | IMAGE C1  |
| R2  | IMAGE A2  | NAME2  | IMAGE C2  |
| R3  | IMAGE A3  | NAME3  | IMAGE C3  |
| R4  | IMAGE A4  | NAME4  | IMAGE C4  |
| R5  | IMAGE A5  | NAME4  | IMAGE C5  |
| R6  | IMAGE A6  | NAME6  | IMAGE C6  |
| R7  | IMAGE A7  | NAME7  | IMAGE C7  |
| R8  | IMAGE A8  | NAME8  | IMAGE C8  |
| R9  | IMAGE A9  | NAME9  | IMAGE C9  |
| R10 | IMAGE A10 | NAME10 | IMAGE C10 |

FIG. 12

STORING COMPRESSION UNITS IN RELATIONAL TABLES

CROSS-REFERENCE TO RELATED APPLICATIONS; BENEFIT CLAIM

This application claims benefit under 35 U.S.C. § 120 as a Continuation of U.S. Ser. No. 12/769,205, filed Apr. 28, 2010, which claims benefit under 35 U.S.C. § 119(e) of Provisional Application 61/174,447, filed Apr. 30, 2009, the entire contents of each of which are hereby incorporated by reference for all purposes, as if fully set forth herein. This application further claims benefit under 35 U.S.C. § 120 as a Continuation-in-part of application Ser. No. 12/617,669, filed Nov. 12, 2009, the entire contents of which are hereby incorporated by reference for all purposes, as if fully set forth herein. Applicants hereby rescind any disclaimer of claim scope in the parent applications or the prosecution history thereof and advise the USPTO that the claims in this application may be broader than any claim in the parent applications.

This application is also related to U.S. patent application Ser. No. 12/769,508 filed Apr. 28, 2010; now U.S. Pat. No. 8,356,060 issued Jan. 15, 2013, entitled Compression Analyzer, the entire contents of which are hereby incorporated by reference as if fully set forth herein.

FIELD OF THE INVENTION

The present invention relates to database storage and, more specifically, to storing database data as compression units within data blocks.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DATABASES AND DATABASE SERVERS

Generally, a server, such as a database server, is a combination of integrated software components and an allocation of computational resources, such as memory, a node, and processes on the node for executing the integrated software components, where the combination of the software and computational resources are dedicated to providing a particular type of function on behalf of clients of the server. A database server governs and facilitates access to a particular database, processing requests by clients to access the database.

A database comprises data and metadata that is stored on a persistent memory mechanism, such as a set of hard disks. Such data and metadata may be stored in a database logically, for example, according to relational and/or object-relational database constructs. Database metadata defines database objects, such as tables, object tables, views, or complex types, such as object types, and, importantly table functions. SQL data definition language ("DDL") instructions are issued to a database server to create or configure database objects.

Generally, data is logically arranged within a database as one or more data containers. Each container contains records, and the data within each record is organized into one or more fields. In relational database systems, the data containers are typically referred to as tables, the records are referred to as rows, and the fields are referred to as columns. In object oriented databases, the data containers are typically referred to as object types or classes, the records are referred to as objects, and the fields are referred to as attributes. Other database architectures may use other terminology. Systems that implement the present invention are not limited to any particular type of data container or database architecture. However, for the purpose of explanation, the examples and the terminology used herein shall be that typically associated with relational or object-relational databases. Thus, the terms "table", "row" and "column" shall be used herein to refer respectively to the data container, record, and field.

DATA BLOCKS

While databases are arranged logically in data containers, those containers are themselves typically stored in one or more data blocks on, for example, a hard disk. So, for example, while most users will issue instructions or queries to the database server that refer to data via reference to tables, rows, and columns, that data is actually stored in a database as a collection of data blocks. Through the use of various stored metadata, indexes, and headers, the database server is able to interpret the data within these data blocks as logical tables, rows, and columns.

A data block is an atomic unit of storage space allocated to store raw data for one or more database records (e.g., rows), or portions thereof. Typically, a database system is configured to read and write database records from persistent storage and volatile memory in units no smaller than data blocks. When a record from a data block needs to be retrieved, the entire data block is read into an in-memory buffer the database system uses to temporarily store data blocks. In many databases, data blocks are all of a common size. Database administrators select this size based on a number of considerations. However, tables often comprise more data than can fit in a single data block. Thus, tables often span many data blocks.

For example, FIG. 1 illustrates how a table 100 may be stored in example data blocks 120 and 130. Because data blocks 120 and 130 are both of a predefined size that is smaller than table 100, it is impossible to fit table 100 in a single data block. Thus table 100 is stored in two data blocks.

Data blocks are typically subdivided into one or more contiguous segments herein described as "data block rows." When interpreted by the database server, each data block row yields data from at least a portion of a table. As implied by the name "data block row," a single data block row holds raw data corresponding to a single row of a table. However, there is not always a one-to-one correspondence between table rows and data block rows.

For example, table 100 is comprised of rows 101-105, organized into columns 111-115. The data for table rows 101-105 is stored in data block rows 121-124 and 131-132. Specifically, each data block row 121-124 and 131-132 comprises multiple fields 190. Each field 190 corresponds to a single column value from table 100. While data block rows 121, 122, 123, and 132 have a one-to-one correspondence with table rows 101, 102, 103, and 105 respectively, the data for table row 104 is divided amongst data block rows 124 and 131. When data for a table row is divided amongst multiple data block rows in different data blocks, the table row is said to chained across the multiple data blocks, and the data block rows may be referred to collectively as a chain.

Although "rows" in a table and "rows" in a data block are both commonly known as "rows," it should by now be apparent that the two types of "rows" are distinct concepts. To avoid confusion, this application shall therefore, where necessary, use the terms "table row" and "data block row," respectively, to refer to "rows" of a data block and "rows" of a table.

In some databases, each data block row is delimited by a row header. Each row header may contain a variety of metadata, including an identifier for the data block row, the number of columns that the database server should expect to read from the data block row, and/or the sizes of each column in the data block row (thereby instructing the database server as to the boundaries of each field in the data block row). For example, each of data block rows 121-124 and 131-132 include a data block row header 121a-124a or 131a-132a. In some embodiments, the size (or length) of each column is instead inserted as a separate field of predefined length that immediately precedes each column field in the data block row.

In some databases, when data for a table row is chained over multiple data block rows (because of, for instance, size or column count limitations), the database may also store metadata associating one or more of the data block rows with one or more other data block rows in which data for the same table row is held. This metadata may be in any location, such as in the row header, data block header, or at the end of the data block row. For instance, pointer 129 in data block row 124 points to data block row 131, which comprises the remaining data values of table row 104.

Data blocks may also have headers and/or other data structures that describe information about the data block and/or the tables whose raw data they hold. For instance, data blocks 120 and 130 comprise header data 125 and 135, respectively. A data block header may, for instance, include metadata such as a table directory that describes various qualities of the tables and table rows for which its data block comprises data. A data block header may also, for instance, include metadata such as a row directory indicating the starting address of and/or an identifier for each data block row in the data block.

The metadata in a data block's header (or in an equivalent structure) may, in some databases, define and delimit the data block rows for the data block. Thus, in some databases, a data block row may be characterized as the lowest level subdivision of a data block whose address is discernable from the data block's header, or as any subdivision of the data block for which the data block header lists an indexable identifier.

Data blocks 120 and 130 are organized in a format known as "row major," and may therefore be described as "row major data blocks." The format is known as "row major" because each data block row 121-124 and 131-132 contains data from only a single row of the table. Other databases may instead store tables within data blocks using other formats, including formats such as "column major." The techniques described herein are applicable to any type of data block, regardless of the format used.

Note that table 100 and data blocks 120-130 are each relatively small in size. This application equally contemplates the use much larger tables and much larger data blocks. However, for the purposes of clarity, the example tables and data blocks herein are relatively simple.

An example implementation of a database with data blocks is described in "Oracle 9i: Database Concepts, Release 2 (9.2)," published by Oracle Corporation in March 2002, and available at the time of writing at http://download.oracle.com/docs/cd/B10501_01/server.920/a96524.pdf, the entire contents of which is hereby incorporated by reference as if fully set forth herein.

ADDRESSING DATA FROM DATA BLOCKS

A database may store a variety of metadata to assist a database server in interpreting the data stored within the database's data blocks. For example, various indexes may comprise mapping data associating each table in the database with one or more data blocks. As another example, various indexes may comprise mapping data that associates table rows with data row blocks.

For example, index 150 of FIG. 1 comprises a list 151 of table rows in table 100, along with addresses 152 of data block rows that contain data for the table rows. Addresses 152—which may also be described as rowids—are each comprised of two elements: a data block identifier, consisting of numbers before the period, and a data block row identifier, consisting of numbers after the period. However, other addressing schemes may also be used.

A database server may utilize such metadata to locate data blocks and/or data block rows that store data for tables and table rows. For example, the database server may require access to data from table row 101 of FIG. 1. Using index 150, the database server may determine that data for table row 101 is in the first data block row of data block 120 (i.e. data block row 121). The database server may then utilize a data block identifier-to-address mapping or algorithm to locate data block 120 on disk. The database server may then utilize other mapping data (such as data in the data block header mapping the data block row identifier to a block-relative address) to locate the start of the first data block row in data block 120. The database server may then read and interpret this row, thereby producing the data for table row 101.

For table rows whose data spans multiple data block rows, row indexes such as index 150 may point only to the data block row that comprises data for the first portion of the table row. Upon determining that the table row is not fully represented by the values in the data block row, the database server may utilize metadata such as pointer 129 to ascertain the location of other data block rows that comprise additional data for the table row. For example, in locating data for table row 104, a database server may be first directed to data block row 124. The database server may then follow pointer 129 to data block row 131, which comprises the remaining data for table row 104.

COMPRESSED DATA BLOCKS

In some databases, the raw data within each data block may be compressed at the block level. For example, if the word "San Jose" appears multiple times within a data block, the data block may substitute each occurrence of "San Jose" with a symbol or smaller set of characters, such as "@1," and then store a decompression dictionary (also known as a symbol table) that associates "@1" with "San Jose." As the database server interprets a data block row that contains such compressed values, the database server may utilize the decompression dictionary to interpret compressed values. In some databases, the decompression dictionary is localized for each block and then stored inside of the block itself (for example, in the data block header). In other databases, the decompression dictionary is shared amongst multiple data blocks, and thus stored in its own block, separate from the multiple data blocks. Such compression schemes shall hereinafter be referred to as "block-based compression."

An example implementation of block-based compression is described in "Oracle Advanced Compression: A White Paper," published by Oracle Corporation in April 2008, and available at the time of writing at http://www.oracle.com/technology/products/database/oracle11g/pdf/advanced-compression-whitepaper.pdf, the entire contents of which is hereby incorporated by reference as if fully set forth herein.

BRIEF DESCRIPTION OF THE DRAWINGS

The present invention is illustrated by way of example, and not by way of limitation, in the figures of the accompanying drawings and in which like reference numerals refer to similar elements and in which:

FIG. 11 is a block diagram of a compression unit, according to an embodiment of the invention;

FIG. 12 is a block diagram of a table that is referred to in examples provided herein;

DETAILED DESCRIPTION

Figure 1:
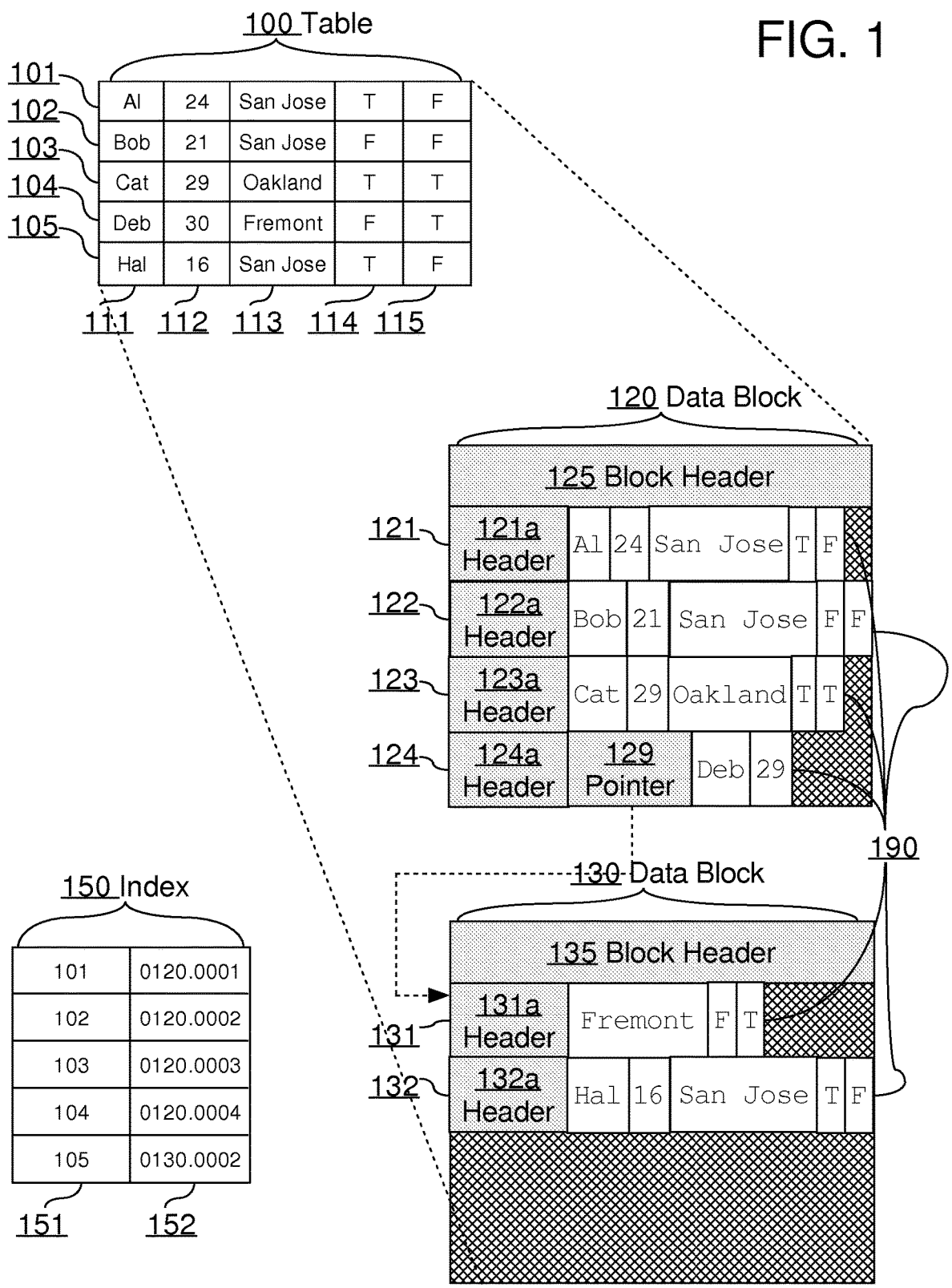
FIG. 1 illustrates how an uncompressed table may be stored in example data blocks.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

1.0. General Overview

Approaches and techniques are described for storing compression units in data blocks of a database. A table, or data from a plurality of rows thereof, is compressed into a "compression unit" using any of a wide variety of compression techniques. The compression unit is then stored in one or more data block rows across one or more data blocks. As a result, a single data block row may comprise compressed data for a plurality of table rows, as encoded within the compression unit.

Storage of compression units in data blocks maintains compatibility with existing data block-based databases, thus allowing the use of compression units in preexisting databases without modification to the underlying format of the database. The compression units may thus co-exist with uncompressed data blocks and data block rows.

According to an embodiment, the manner of storage is such that, except for added resource consumption for decompression, the compression is transparent to the user. For example, the database server may provide access to rows within compression units via a query or an index, even though the database server may be required to decompress portions of the compression unit to discover what data is contained within the rows, or even the exact location of the rows.

According to an embodiment, when the database server receives a request that requires the database server to access one or more table rows that have been stored in a compression unit, the database server locates the one or more data blocks in which the compression unit is stored. The database server decompresses the compression unit (or a portion thereof) and places the resulting decompressed matrix in a temporary buffer. The database server may then locate the desired data in the decompressed matrix.

According to an embodiment, each table row in a compression unit is addressed within the database with reference to the row number of the table row in the compression unit, as opposed to a data block row number. When the database server is directed to a data block row that includes a compression unit, the database server thus takes additional steps to ascertain the exact location of the desired table row. For example, the database server may decompress the compression unit (or a portion thereof) and utilize mapping data within or associated with the compression unit to determine the location of the desired table row in the decompressed compression unit.

According to an embodiment, to avoid confusion in databases where compression units coexist with uncompressed data (or data that has been compressed at the data block level), the database stores metadata, such as a flag in the data block header or row header, indicating that a data block row comprises a compression unit. When metadata for a data block indicates that a data block row comprises a compression unit, the database server processes the data block row using the compression unit techniques described herein. If the metadata does not indicate that the data block row comprises a compression unit, the database server interprets the data block row using conventional techniques.

According to an embodiment, a single compression unit may span multiple data blocks. For example, a first data block row in a first data block may contain a first portion of the compression unit, a second data block row in a second data block may contain a second portion of the compression unit, and so forth.

According to an embodiment, each compression unit is associated with metadata that indicates addresses at which some or all of table rows and/or table columns in the compression unit are stored. Based on this information, the database server may determine that certain data (e.g. a desired column or row) is contained entirely within a first portion of the compression unit stored within a first data block. To access this certain data, the database server need only retrieve the first data block and decompress the first portion. The database server need not, for instance, retrieve a second data block and decompress a second portion of the compression unit stored within the second data block. Thus, the database server performs selective decompression of compression unit portions. The database server selectively fetches and decompresses only those data blocks in which required compression unit portions are stored. For instance, if the required table rows and/or columns are stored only in portions mapped to the first and third data blocks in a chain, the database server need fetch only the first and third data blocks and decompress the compression unit portions stored therein. The database server needs neither to fetch nor decompress any data from the second data block.

According to an embodiment, each compression unit may be associated with metadata that identifies, for each of certain rows and/or columns in the table, an address of a location relative to the compression unit at which the certain row and/or column is stored. Each compression unit may further be associated with metadata that identifies the starting address (relative to the compression unit) of each portion of the compression unit, along with the data block at which each portion of the compression unit is stored. Such metadata may be stored in, for example, a header inside of the compression unit, a compression unit row header inside of the data block row, the data block row header, the data block header, a separate index, and/or any other suitable location.

In other aspects, the invention encompasses a computer apparatus and a computer-readable medium configured to carry out the foregoing steps.

2.0. Structural Overview 2.1. Compression Units

A highly flexible and extensible structure is provided for physically storing tabular data. The structure, referred to herein as a "compression unit", may be used to physically store tabular data that logically resides in any type of table-like structure. For example, compression units may be used to store tabular data from spreadsheets, relational database tables, or tables embedded in word processing documents. There are no limits with respect to the nature of the logical structures to which the tabular data that is stored in compression units belongs.

According to one embodiment, compression units are recursive. Thus, a compression unit may have a "parent" compression unit to which it belongs, and may have one or more "child" compression units that belong to it. There is no limit to the number of recursive levels of compression units that may be used to store tabular data. For the purpose of explanation, a compression unit that has no parent is referred to herein as a "top-level" recursive unit, while a compression unit that has no children is referred to herein as a "bottom-level" compression unit.

According to one embodiment, each top-level compression unit stores data for all columns of the corresponding table. For example, if a table has twenty columns, then each top-level compression unit for that table will store data for different rows, but each of those rows will have data for all twenty columns. However, in alternative embodiments, even at the top-level, data from a table may be divided among compression units based on columns. Thus, some top-level compression units may store data for the first ten columns of a table, while other top-level compression units store data for the second ten columns of the table. In such an embodiment, a single row of the table may be spread among several top-level compression units.

In one embodiment, compression units include metadata that indicates how the tabular data is stored within them. The metadata for a compression unit may indicate, for example, whether the data within the compression unit is stored in row-major or column major-format (or some combination thereof), the order of the columns within the compression unit (which may differ from the logical order of the columns dictated by the definition of their logical container), a compression technique for the compression unit, the child compression units (if any), etc.

According to an embodiment, data from certain table rows (or an entire table) in a database may be compressed into compression units. For example, table 100 of FIG. 1 may be compressed entirely into a single compression unit using any of a variety of techniques. Example techniques for compressing tabular data into a compression unit are discussed, for instance, in U.S. patent application Ser. No. 12/617,669 by Ganesh et al., entitled "STRUCTURE OF HIERARCHICAL COMPRESSED DATA STRUCTURE FOR TABULAR DATA" and filed Nov. 12, 2009, and in U.S. patent application Ser. No. 12/769,508 by Kapoor, et al., entitled "COMPRESSION ANALYZER" and filed Apr. 28, 2010, the entire contents of both of which are hereby incorporated by reference as if fully set forth herein. However, embodiments of the invention are not limited to the techniques described in "STRUCTURE OF HIERARCHICAL COMPRESSED DATA STRUCTURE FOR TABULAR DATA" or "COMPRESSION ANALYZER." For example, table 100 may be compressed into a compression unit by simply encoding the table in accordance with a common archiving format such as ZIP or RAR.

According to an embodiment, a compression unit need not necessarily include an entire table or index. For example, a table may be divided into any number of portions based on selected columns and/or rows. The following divisions of table 100 are just several of the many ways table 100 could be divided: (1) a first portion for columns 111-113 and a second portion for columns 114-115; (2) a first portion for rows 101-102, a second portion for rows 103-104, and a third portion for row 105; (3) a first portion for columns 111-112 of rows 101-102; a second portion for columns 111-112 of rows 103-105; and a third portion for columns 113-115 of all rows. Once a table has been divided into portions, each portion may then be compressed into a separate compression unit. Or, in some cases, certain portions may remain uncompressed.

For convenience, this application may refer to certain compression units as compressed data for certain tables. By such language, this application does not limit its techniques to compression units comprising an entire table; rather a compression unit may simply comprise data from at least a portion of the table. Likewise, this application may, for convenience, describe certain compression units as comprising compressed data for one or more table rows or one or more of table columns. By such language, this application does not require that the compression units include each and every value in each of the one or more table rows or in each of the one or more table columns. Rather, a compression unit that includes compressed data for one or more table rows or one or more of table columns may simply include compressed data from at least a portion of each table row or table column in the one or more table rows or the one or more table columns.

A table may be divided into portions for the purposes of generating compression units based on any of a number of considerations. For example, it may be desirable to break up very large tables into multiple compression units. Or, it may be desirable to compress only certain columns of the table in a compression unit. Example considerations for determining how to divide a table into portions are discussed in, for example, "COMPRESSION ANALYZER."

Compression for compression units occurs outside of the data block context, and instead at a table-wide or portion-wide level. So, for example, instead of compressing data values in a data block individually as they are inserted in the data block, or instead of compressing data values after they have been stored in a data block, a database server compresses the entire table or a multi-value portion thereof outside of the data block context. The database server then stores the compression unit (as opposed to individual compressed values) in the data block, according to the various techniques such as those described herein.

In some embodiments, each compression unit is "self-contained," meaning that decompression metadata (such as a dictionary or other information helpful in choosing and implementing a decompression algorithm) is stored within the compression unit as opposed to within data block headers or within other data blocks. This means, for instance, that in a data block with multiple compression units, each compression unit may have its own unique decompression data. In other embodiments, decompression metadata may instead be stored separate from the compression unit, but the decompression metadata nonetheless applies to the compression unit as a whole and not at the data block level.

In compression units that span multiple portions, the decompression metadata may only be found in a single portion of the compression unit (e.g. the header), and thus not be present in some or most of the data blocks in which compression unit portions reside. Thus, to decompress a portion of the compression unit that has been stored in a data block other than the data block that includes the portion with the decompression metadata, the portion with the decompression metadata must be read. However, in some embodiments it may not be necessary to read or decompress portions other than these two portions.

As mentioned above, compression for compression units occurs outside of the data block context, and instead at a table-wide or portion-wide level. Compression of a whole table (or selected portions thereof) as a single compression unit outside of the data block context provides numerous benefits over block-based compression. For example, data blocks that have been compressed using block-based compression must still conform to the data block format, just like any other data block. Thus, while block-based compression can utilize compression algorithms that replace column values with symbols, block-based compression cannot, for example, employ any compression algorithm that would alter the fundamental structure of the data block. Moreover, many other compression algorithms do not lend themselves to the data block format.

Another example of an advantage of compression units over many block-based compression implementations—especially implementations with dictionaries that are local to each block—is that compression units are able to compress larger amounts of data in one unit, therefore increasing the likelihood that a given data item can be compressed. For example, consider a table for which a certain column always contains one of a handful of values. Compression of those values may not be possible at the data block level if the table spans a large number of data blocks (for instance, if each data block comprises only a few rows of the table).

Another example of an advantage of compression units over many block-based compression implementations is the flexibility that compression units offer in optimizing a decompression dictionary. Data in a compression unit may be carefully selected and arranged so as to minimize the size of the decompression dictionary—and in fact, different subunits of the compression unit may each have a different and more finely tailored data dictionary. Meanwhile, a block-based decompression dictionary must include translation data for an entire block, even if data in some parts of the block bears little resemblance to data in other parts of the block.

For further examples of advantages that result from divorcing compression techniques from the data block itself, see for instance the compression units described in "STRUCTURE OF HIERARCHICAL COMPRESSED DATA STRUCTURE FOR TABULAR DATA" and "COMPRESSION ANALYZER."

2.2. Storing a Compression Unit in a Single Data Block

Figure 2:
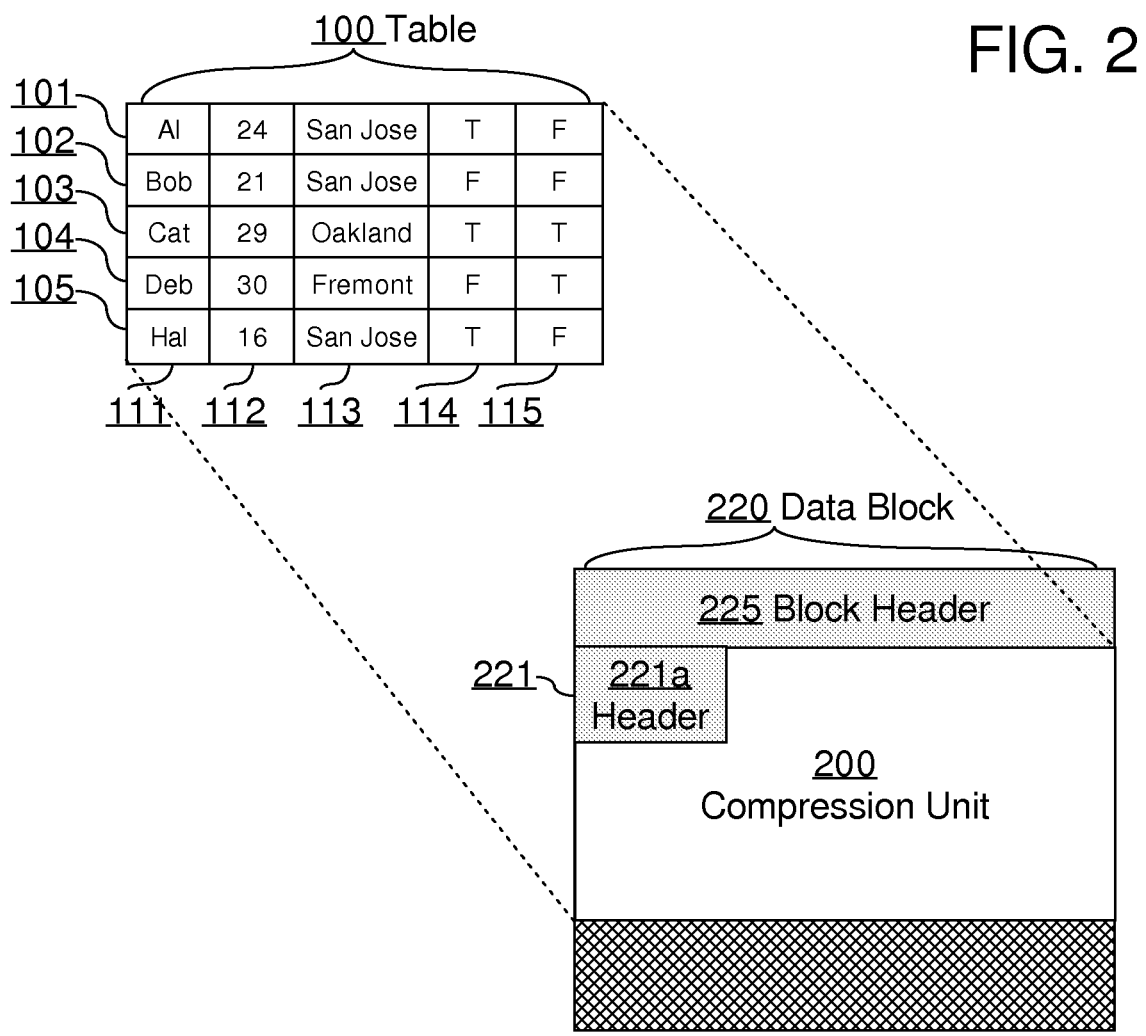
FIG. 2 illustrates a data block in which is stored a complete compression unit.

FIG. 2 illustrates a data block 220 in which is stored a complete compression unit 200, according to an embodiment. As depicted, compression unit 200 is a compressed version of the entire table 100. However, compression unit 200 may be a compressed version of any table or portion thereof. Data block 220 is of the same size as data blocks 120 and 130 of FIG. 1. However, on account of the data for table 100 being compressed inside of compression unit 200, the data for table 100 is able to fit inside of a single data block 220 as opposed to multiple data blocks as in FIG. 1.

Like data blocks 120 and 130, data block 220 comprises a data block row 221. Data block row 221 includes a data block row header 221a, just like the data block rows of data blocks 120 and 130. However, unlike the data block rows of data blocks 120 and 130, data block row 221 stores compression unit 200 instead of a plurality of fields with individual column values from a table row of table 100. Thus, while each data block row of data blocks 120 and 130 stores data from only a single row of table 100, data block row 221 stores the compressed data for a plurality of table rows—in this case, for table 100 in its entirety.

In an embodiment, compression unit 200 is stored as if it were a column field of the data block row. The data block row therefore includes data indicating the length of the compression unit 200 in, for example, a length field immediately preceding compression unit 200.

Also like data blocks 120 and 130, data block 220 comprises a data block header 225 in which is stored various metadata to assist a database server in interpreting the data in data block 220.

2.3. Chaining a Compression Unit Over Multiple Data Blocks

Depending on the size of a compression unit and the size of the data blocks available to store the compression unit, it may be necessary to divide a compression unit into separate portions that may be stored over multiple data blocks. This division of the compression unit into one or more compression unit portions occurs subsequent to generating the compression unit, and is therefore conceptually separate from the previously discussed division of a table into one or more table portions (although data block size may nonetheless be a consideration in determining how divide a table into portions for compression).

A variety of techniques may be used to divide a compression unit into portions. The compression unit may be divided, for example, so that all portions of the compression unit (or all but the last portion) are of a desired size, the desired size being less than or equal to the size of data blocks in the database. As another example, the compression unit may be divided based on characteristics of the compressed data inside of the compression unit—so that, for example, the compressed data for certain columns or rows is contained entirely within a portion or group of portions.

Figure 3:
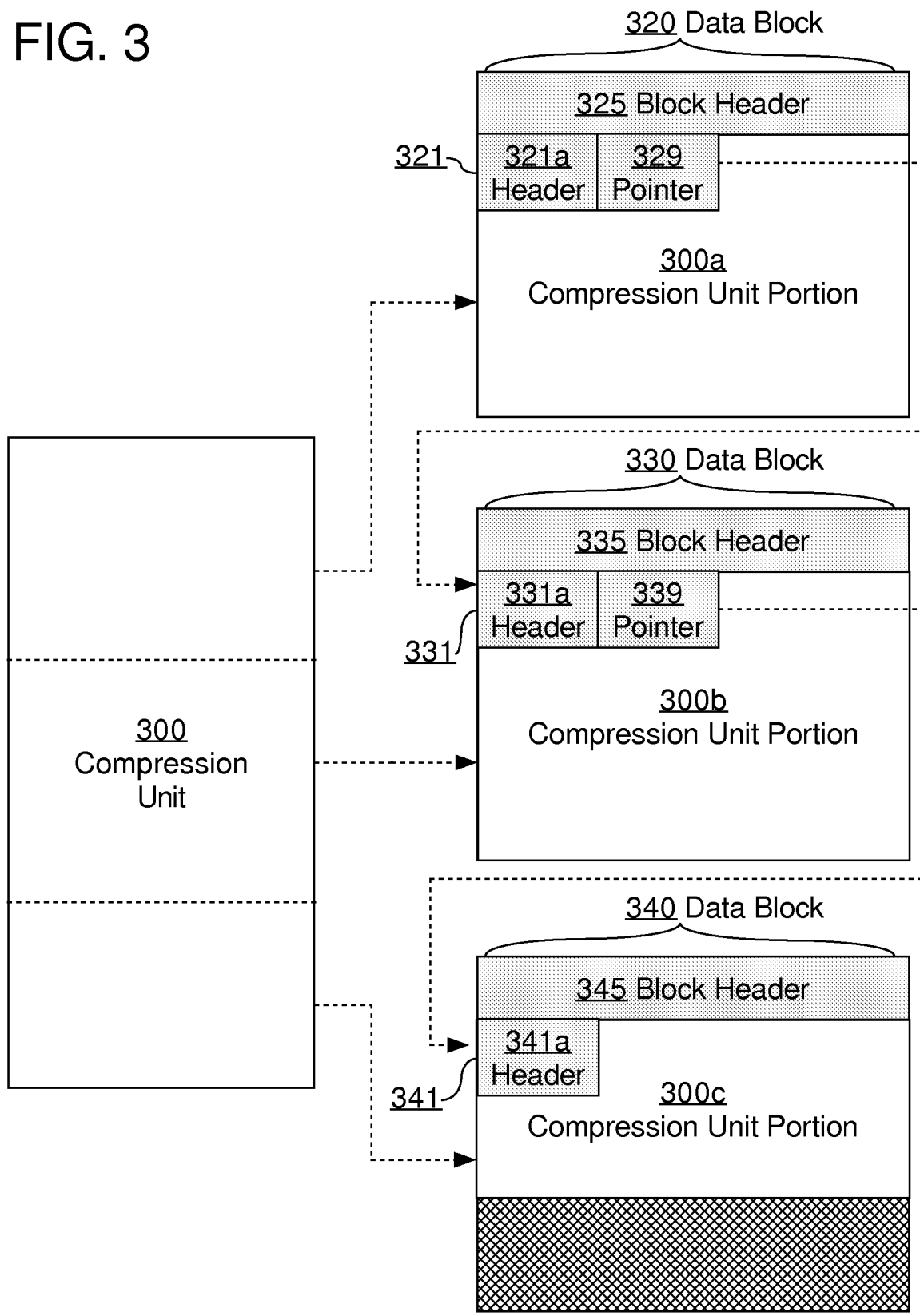
FIG. 3 illustrates a compression unit stored over several data blocks instead of in a single data block.

For example, FIG. 3 illustrates a compression unit 300 stored over several data blocks instead of in a single data block, according to an embodiment of the invention. Specifically, compression unit 300 is divided into three portions 300a, 300b, and 300c, each stored in a separate data block 320, 330, or 340. Portion 300a is stored in data block row 321 of data block 320. Portion 300b is stored in data block row 331 of data block 330. Portion 300c is stored in data block row 341 of data block 340.

As with uncompressed table rows that span multiple data block rows, compression unit 300 may be described as being chained across multiple data blocks. Data block rows 321, 331, and 341 and compression unit portions 300a, 300b, and 300c may both be described as chains.

Data block rows 321, 331, and 341 each comprise a data block row header 321a, 331a, and 341a, respectively. Data block rows 321 and 331 each further comprise a pointer 329 and 339 respectively. Like pointer 129 of FIG. 1, pointers 329 and 339 point to other data block rows in the chain. In this case, pointer 329 points to data block row 331 and pointer 339 points to data block row 341. Pointers 329 and 339 instruct a database server that the data in data block rows 321 and 331 is only a portion of the compression unit, and further instruct the database server as to where it should go to find the next portion in the chain.

For example, the database server may read data block row 321 to retrieve portion 300a. While reading data block row 321, the database server would encounter pointer 329. Upon encountering pointer 329, the database server would then read data block row 331 and find compression unit portion 300b. Portion 300b would be appended to 300a. However, the database server would further encounter pointer 339 in data block row 331. Thus, the database server would then read data block row 341 to obtain portion 300c. Portion 300c would then be appended to portions 300a and 300b to yield the complete compression unit 300. Compression unit 300 may then be decompressed.

Data blocks 320, 330, and 340 further comprise data block headers 325, 335, and 345, respectively. An example data block header is described in further detail in a subsequent section.

In an embodiment, compression unit portions are stored in data blocks that are co-located in a contiguous segment of memory or storage. Thus, the database server may retrieve the compression unit (or a contiguous set of compression unit portions) from the memory or storage in a single input/output (I/O) operation. For example, data blocks 320, 330, and 340 may be contiguous data blocks. To read these data blocks from disk, the database server need only issue a single I/O request for the range of data blocks starting with data block 320 and ending with data block 340. The compression of table data afforded by compression units, coupled with this co-location of data for compression unit portions in a contiguous range of data blocks, allows the database server to quickly read data for a table or significant portion thereof with a minimal number of I/O operations.

In an embodiment, the database server may utilize the co-location of compression unit portions in contiguous data blocks to perform prefetching. When the database server requires a data block comprising one portion of a compression unit, the database server may, in the same I/O operation, also fetch other contiguous data blocks that comprise other compression unit portions for the same compression unit, even though those compression unit portions may not yet be required. For example, if a database server were to determine that it required access to compression unit portion 300b in data block 330, the database server may also decide to fetch data blocks 320 and 340 because they are stored in a contiguous storage segment and happen to comprise other compression unit portions for compression unit 300. In this manner, the database server may preemptively cache other compression unit portions that are likely to be required in the same time frame as the first compression unit portion, thereby avoiding the need for performing subsequent I/O operations to fetch the other compression unit portions should those portions be required at a later time.

2.4. Compression Unit Row Header

According to an embodiment, the database may store metadata for each compression unit or compression unit portion to assist the database server in interpreting the data compressed in the compression unit. For example, the database server may store mapping metadata that offers both sequential access to compression unit portions and random access to compressed data for select rows and/or columns of the compression unit. A database may store metadata to assist the database server in interpreting the compression unit in a variety of locations. For example, some or all of this metadata may be stored as a separate field in the data block row, immediately preceding the compression unit or compression unit portion.

Figure 4:
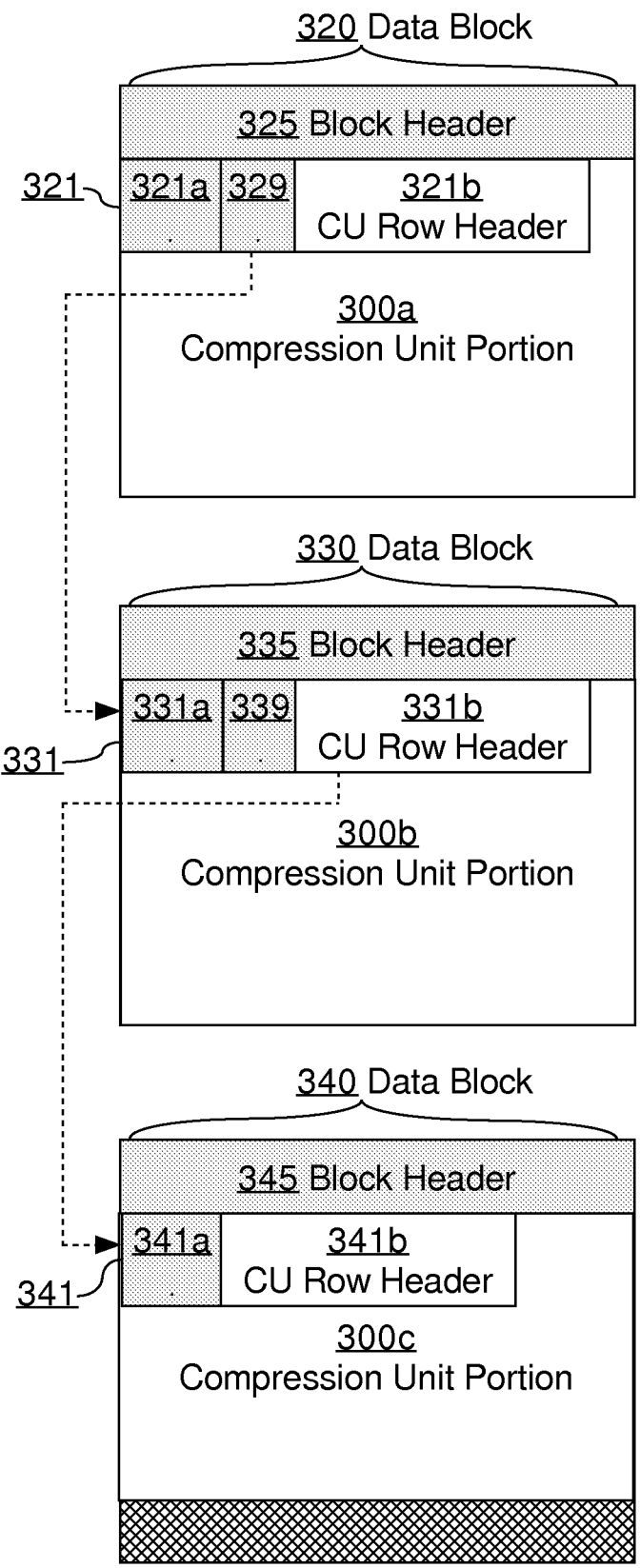
FIG. 4 illustrates example data blocks with an added compression unit row header.

FIG. 4 illustrates example data blocks 320, 330, and 340, each with an added compression unit row header for storing such metadata, according to an embodiment of the invention. For example, data block row 321 now includes a field 321b for a compression unit row header. Data block rows 331 and 341 likewise include compression unit row headers 331b and 341b. In some embodiments, compression unit row headers 331b and 341b are trivial, in that they are simply copies of compression unit row header 321b, or are empty or omitted. In other embodiments, compression unit row headers 331b and 341b may include metadata specific to compression unit portions 300b and 300c, respectively.

In an embodiment, the size of a compression unit row header is variable, thereby providing a database with the flexibility to store any of a wide variety of metadata in the compression unit row header. For example, a database sever may be configured to assume that a certain field—in this case the first field (field 321b)—is a compression unit row header, and that a second field (compression unit portion 300a) is the payload data for the compression unit itself. Since fields may be of any length (assuming the length is not greater than the data block size itself), the compression unit row header may store any amount of such metadata.

Among the types of metadata that may be useful to store in a compression unit row header are: metadata identifying the number of portions into which the compression unit has been divided, metadata identifying addresses of data blocks or data block rows at which each portion may be found, metadata identifying the size or unit-relative offset of each portion of the compression unit, metadata describing how the data in the compression unit is arranged or was compressed, metadata mapping certain rows and/or columns to certain portions of the compression unit, metadata indicating characteristics of the compression unit, metadata indicating a compression level for the compression unit, metadata indicating contiguous blocks storing the compression unit, metadata indicating the number of data block row addresses that have been allocated to the compression unit, and metadata indicating other compression units storing compressed data for the same table. Other example metadata is described in subsequent sections.

In an embodiment, some or any of the above metadata may instead be stored in other locations, such as in the data block row header, the data block header, a header inside the compression unit, or an external table.

2.5. Multiple Compression Units in a Single Data Block

While the data blocks of FIGS. 2-4 depict embodiments of the invention in which a data block may store at most a single compression unit, other embodiments of the invention allow a data block to store multiple compression units. For example, in some embodiments, different compression units based on a same table may be stored in a single data block. In some embodiments, different compression units may be stored in a single data block, regardless of whether the compression units originate from the same table. In this manner, a single data block may store archived versions of any number of tables. This technique may be particularly useful for databases with large data block sizes and many small tables, thus avoiding the need to allocate a separate data block for each table. However, this technique may also be useful in other contexts.

Figure 5:
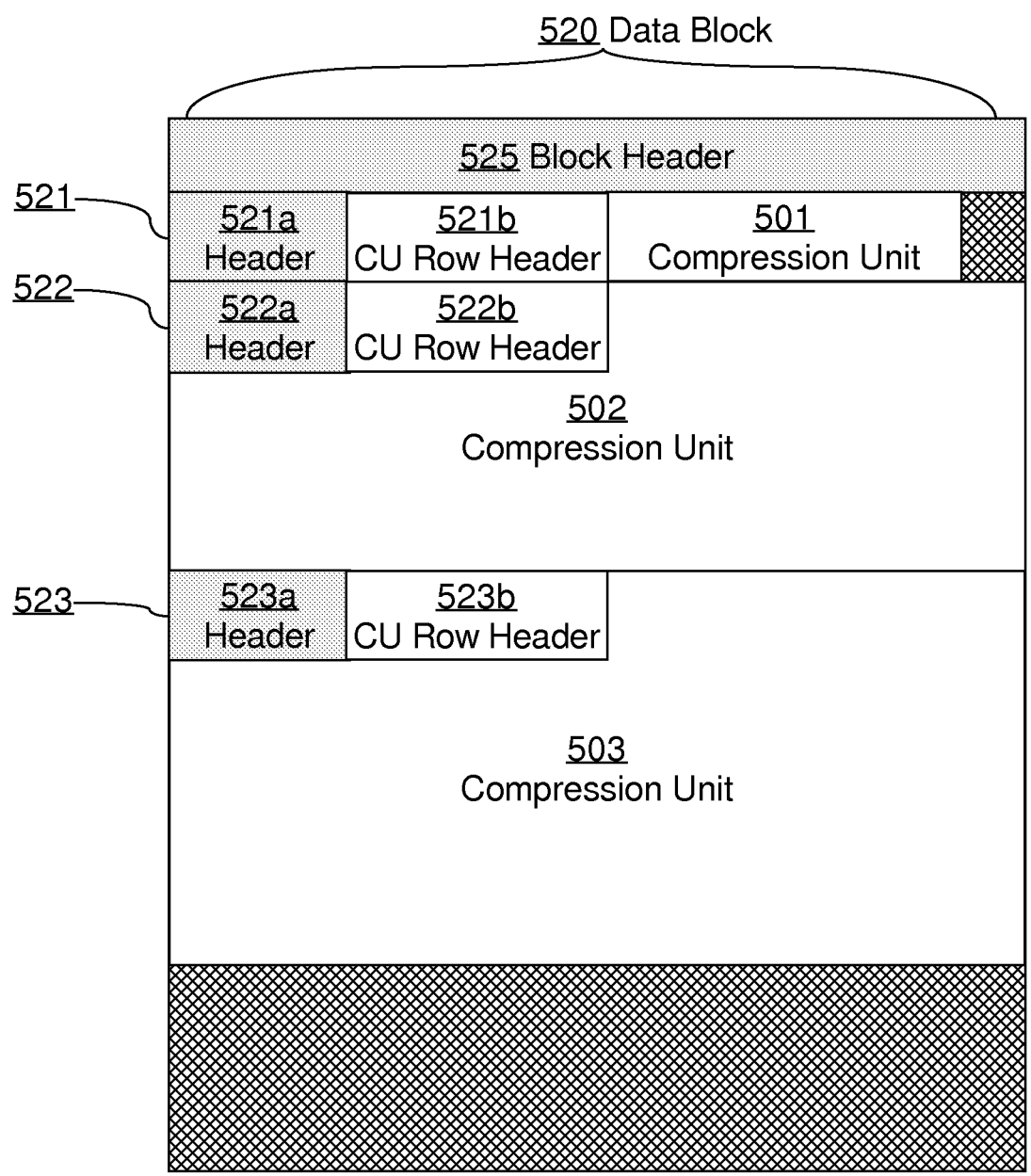
FIG. 5 illustrates a data block comprising multiple compression units.

For example, FIG. 5 illustrates a data block 520 comprising multiple compression units 501, 502, and 503. Compression unit 501 is stored in data block row 521, compression unit 502 is stored in data block row 522, and compression unit 503 is stored in data block 523. As with other data block rows depicted herein, each of data block rows 521, 522, and 523 also comprise a data block row header 521a, 522a, and 523a, respectively, and a compression unit row header 521b, 522b, and 523b, respectively. Moreover, data block 520 also comprises a data block header 525.

As depicted in FIG. 5, each data block row comprises only a single compression unit (or compression unit portion). However, in other embodiments, multiple compression units may be stored as different fields of a same data block row. The multiple compression units can belong to the same table or to different tables.

2.6. Row Addressing

Many databases store an index, such as index 150, mapping each table row in the database to a data block row. According to an embodiment of the invention, in order to provide normal access to data in compression units, a database provides a way to address each table row compressed inside of a compression unit. Like with uncompressed rows, the first portion of an address for a table row that has been compressed in a compression unit consists of a block identifier. However, instead of the second portion of the address specifying a data block row identifier, the second portion of the address specifies a row identifier relative to the compression unit.

In data blocks comprising only a single compression unit, resolution of such an address is straightforward. For example, consider the address 0320.0004. Once the database server determines that the data block 320 comprises a single compression unit, the database server would decompress the compression unit in the first data block row of data block 320. The database server would then interpret the address 0320.0004 to refer to fourth row listed in the decompressed compression unit. By contrast, the database server would interpret this address to refer to the fourth data block row of data block 320 if data block 320 had not comprised a compression unit.

In data blocks comprising multiple compression units, address resolution is more complex. For example, it may not be clear whether 0320.0004 refers to the fourth row of the compression unit in the first data block row, or the fourth row of the compression unit in the second data block row. To resolve this ambiguity, the address of each row compressed in each compression unit after the first compression unit is deemed to be offset by the total number of table rows compressed in all of the preceding compression unit. So, for example, if the first compression unit comprises compressed data for two rows, the address 0320.004 would resolve to the second decompressed row in the compression unit occupying the second data block row of data block 320.

To avoid having to decompress each compression unit so as to count the table rows stored therein, the database server may determine the number of table rows compressed in each compression unit based on size metadata in, for example, a compression unit row header.

In some embodiments, the number of table rows compressed in a compression unit may change frequently due to deletions and additions. To avoid having to update the address assigned to table rows in a compression unit whenever a table row is added or deleted in another compression unit stored in the same block, each compression unit may be allocated a certain number of rows. For example, the first compression unit may be allocated three rows. Thus, the addresses in the second compression unit would be deemed to start at 4, even if the first compression unit only contained compressed data for one table row. Metadata indicating the number of rows allocated may be stored in a suitable location such as the compression unit row header or the data block header. Or, metadata indicating a starting row offset or starting "slot" may also be stored for each compression unit.

Figure 6:
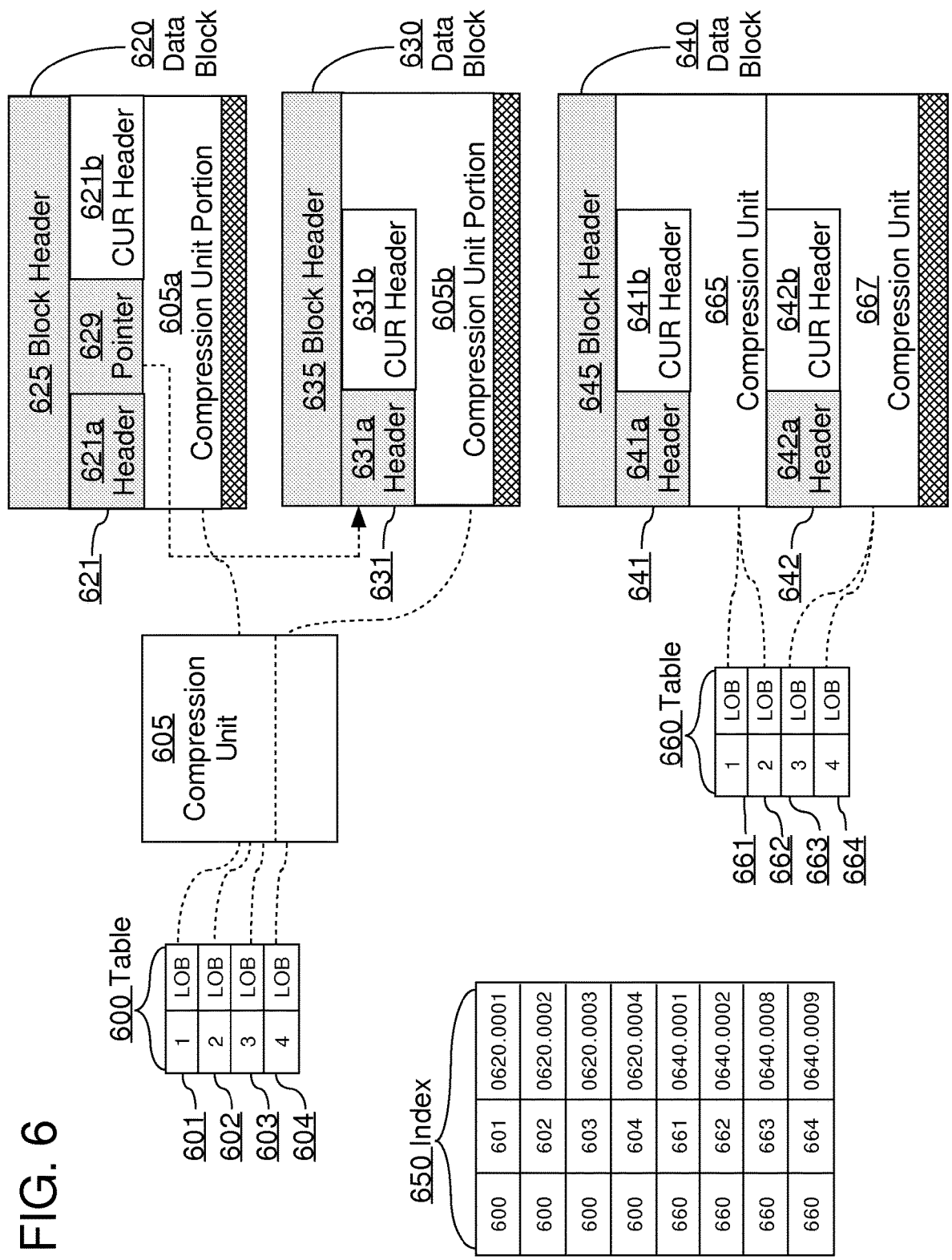
FIG. 6 illustrates a table row index in which a database server has relied upon a compression unit-based address scheme.

For example, FIG. 6 illustrates a table row index 650 in which are stored compression unit-based addresses, according to an embodiment of the invention. Table row index 650 is backwards compatible with conventional indexes, such as index 150, in that it contains no modifications to underlying index formats and structures.

Table row index 650 comprises index data for tables 600 and 660. Table 600, comprising table rows 601-604, has been compressed into compression unit 605. Compression unit 605 is divided into portions 605a and 605b, which are stored in data block row 621 of data block 620 and data block row 631 of data block 630, respectively. Table 660 comprises table rows 661-662, compressed into compression unit 665, and table rows 663-664, compressed into compression unit 667. Compression unit 665 is stored inside of data block row 641 of data block 640 and compression unit 667 is stored inside of data block row 642 of data block 640. Metadata indicating the number of rows allocated to each data block row is stored in compression unit row headers 621b, 641b, and 642b. Data block rows 621, 631, 641, and 642 also comprise data block headers 621a, 631a, 641a, and 642a, respectively.

Table row index 650 indexes each of table rows 601-604 and 661-664 using the address scheme described above. Table rows 601-604 are indexed to the first four rows of compression unit 605 in data block 620. Table rows 661-662 are indexed to the first two rows of compression unit 665 of data block 640.

Table rows 663-664 are indexed to rowids 8-9 of data block 640. Since, as depicted in compression unit row header 641*b*, compression unit 665 is allocated seven rows, a database server will subtract this offset from the rowids for rows 663-664, thus resolving the addresses 0660.0008 and 0660.0009 to the first two rows of compression unit 667.

Other addressing schemes may also be used. For example, according to an embodiment, all table rows in a compressed unit are indexed directly to the data block row in which they are stored. Since many table rows may be compressed in a single compression unit and then stored in a single data block row, a database server must be configured to employ additional steps to locate the table rows within the compressed unit, such as consulting metadata in the compression unit or the compression unit header.

2.7. Data Block Header and Row Headers

To assist the database server in interpreting data blocks that comprise compression units, it may be desirable to add various items of metadata to the data block header itself. Many of the metadata items already discussed may be stored in a data block header. Additionally, a data block header may store metadata indicating whether or not a data block comprises compression units. Such metadata may be in the form of, for example, a compression flag or byte.

It may also be desirable to store some of the metadata described herein in a data block row header. In contrast to metadata stored at the data block header level, metadata stored at the data block row level may be made to apply only to the data block row as opposed to the data block as a whole. For instance, a first data block row header in a data block may include metadata indicating that its associated data block row comprises a compression unit, whereas a second data block row header in the same data block may include metadata indicating that its associated data block row does not comprise a compression unit.

According to an embodiment, any or all of the information described herein as being stored in a data block header may instead be stored in one or more locations external to the data block. In fact, a data block may not necessarily comprise a data block header at all.

3.0. Functional Overview 3.1. Generating and Storing Compression Units

Figure 7:
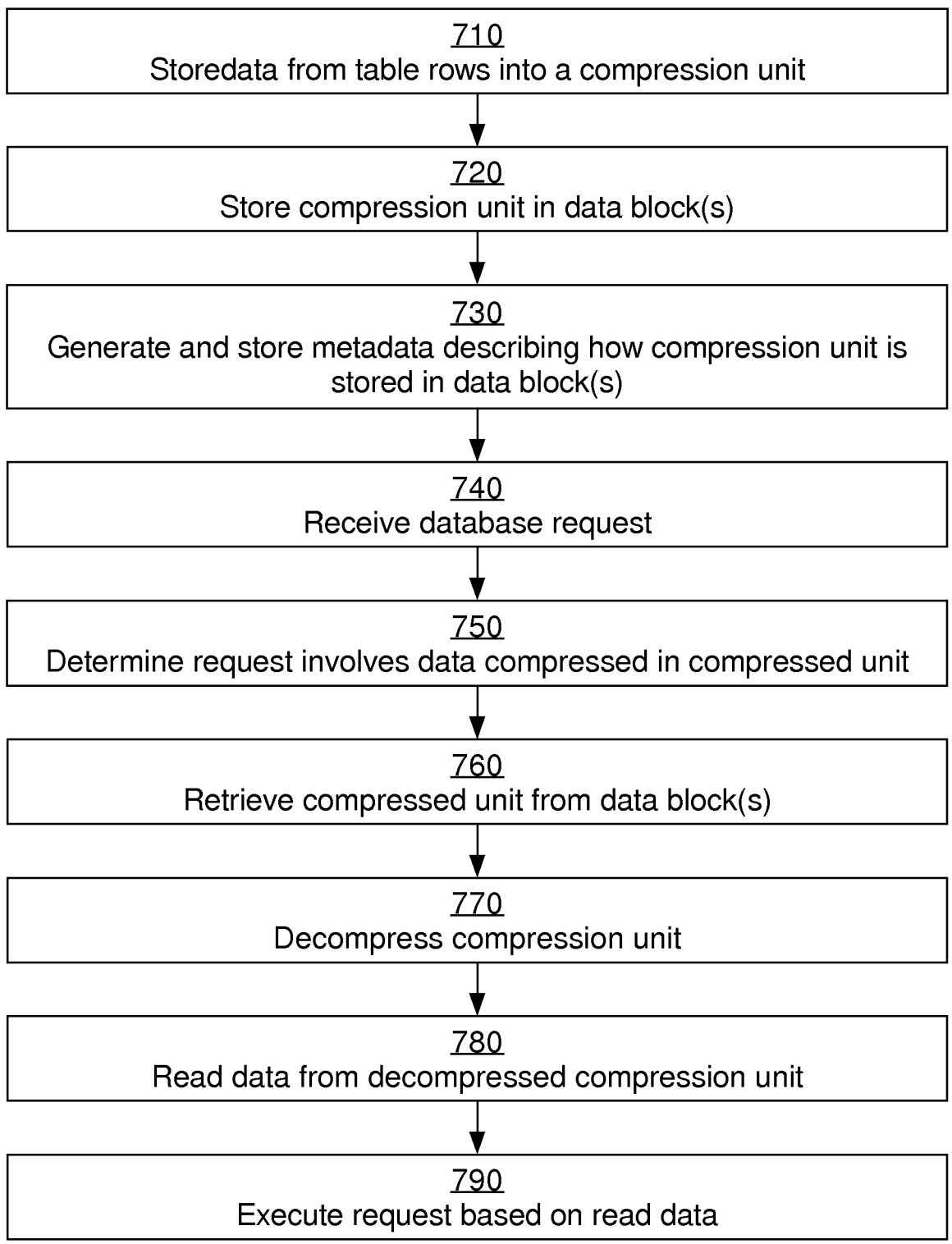
FIG. 7 is a flowchart illustrating a method for utilizing data blocks for storing units of data.

FIG. 7 is a flowchart 700 illustrating a method for utilizing data blocks for storing units of data, according to an embodiment of the invention. The steps of FIG. 7 constitute merely one of many methods that may be performed to store and utilize compression units in data blocks. Other methods may include more or fewer steps in other orders than depicted in FIG. 7.

At step 710, a database server stores data from table rows in a table, such as table 100, into a compression unit, such as any of the example compression units described herein. The data may be compressed using any known lossless technique. The database server may always use the same technique, or the database server may use a different technique depending on the nature of the data in the compression unit. To assist the database server in decompressing the compression unit, the database server may generate metadata indicating the technique used, and then store the metadata in the compression unit or at some other location. As discussed above, the data may comprise data for the entire table or data from a selected subset of the table. In an embodiment, the compression unit includes compressed data from at least two or more table rows.

In an embodiment, step 710 comprises compressing the table rows into a smaller, compressed format. In an embodiment, step 710—and, as used herein, the process of storing data into a compression unit in general—does not necessarily involve compressing the data into a smaller, compressed format, but rather may simply involve wrapping the table rows within the compression unit.

At step 720, the database server stores the compression unit in one or more data blocks. Assuming the compression unit is smaller than some threshold size relative to the target data block size, the compression unit may be placed entirely within a single data block. Otherwise, the compression unit is divided into portions, with each portion being stored in a different data block. In an embodiment, each portion (or the entire compression unit if the compression unit remains undivided) is stored entirely as row data within a single data block row of the data block in which the portion is stored. In an embodiment, each portion (or the entire compression unit) is stored as a variable-length field of its respective data block row. In an embodiment, each portion of the compression unit comprises compressed data from a plurality of table rows from the table.

At step 730, which may occur at any time relative to step 720, the database server may generate and store metadata to assist the database server in subsequently accessing the data that has been compressed into the compression unit. For example, the database server may generate metadata indicating that the data blocks or data block row headers at which the compression unit is stored are to be interpreted as storing a compression unit or compression unit portion (as opposed to, for example, fields of uncompressed values). As another example, the database server may generate metadata indexing each compressed table row to an address such as described in previous sections. As another example, the database server may generate metadata indicating the size and location of each portion. As another example, the database server may generate metadata for certain compression unit portions pointing to the data block or data block row at which the next compression unit portion may be found. As another example, the database server may generate metadata indicating the location within the compression unit of the compressed data for certain table rows and/or table columns. The database server may store such metadata in a variety of locations, including a compression unit row header, data block row header, data block header, and/or index, as discussed in previous sections.

At step 740, occurring some time after completion of steps 710-730, the database server may receive a request, such as a query or other database statement.

At step 750, the database server may determine that the request requires access to data that was stored into the compression unit during step 710. For example, the request may have been a query that requests values from a certain column for each row of a table that has been compressed inside of the compression unit. Or, the request may have been a query that requests values from a specific row of a table that has been compressed inside of the compression unit.

At step 760, the database server retrieves the compression unit from the one or more data blocks at which the compression unit is stored. For example, the database server may utilize metadata in the database, including the metadata generated in step 730, to locate each data block row at which the compression unit (or portion thereof) is stored. The compression unit (or compression unit portions) may then be retrieved from the data block row or rows in the same manner as the database server would retrieve an uncompressed column value from a field of a conventional data block row. If multiple compression unit portions are involved, the database server appends the compression unit portions to each other to yield the complete compression unit.

In an embodiment, the process of locating each data block row may comprise searching an index to determine which data blocks or data block rows are assigned to the implicated table or table rows. In some embodiments featuring a compression unit that has been chained across multiple data blocks, the index may only indicate an initial data block or data block row assigned to the table or table row. Thus, the database server may locate the first portion of the compression unit in that initial data block, then access other metadata (such as pointer 329 or 339) to follow the chain of data blocks and locate the remaining compression unit portions.

At step 770, the database server decompresses the compression unit, thereby yielding a decompressed compression unit. This decompressed compression unit is, essentially, the same table or table subset that was stored in the compression unit step 710. The exact technique used to decompress the compression unit will depend on the manner in which the data was stored in step 710. In some embodiments, the decompression technique is discernable from the compression unit itself, or from metadata that was generated in step 710. In an embodiment the decompression of step 770 involves expanding smaller data in a compressed format into uncompressed data for the table. In another embodiment, step 770, and, as used herein, the process of decompressing a compression unit in general, entails simply unwrapping the table rows from the compression unit—e.g. removing compression unit headers—and does not necessarily involve expansion of the smaller, compressed data into table rows.

In an embodiment, the decompressed compression unit is placed in a temporary memory, such as a reusable buffer. The database server may be configured to first check this buffer prior to hitting the database for data to see if the data has already been retrieved and decompressed.

At step 780, the data to execute the request is retrieved in uncompressed form from the decompressed compression unit.

At step 790, the request is executed based on the retrieved data.

In the event that the table whose data was compressed in step 710 comprises other data that has been compressed in other compression units, steps 760-770 may also be performed with respect to the other compression units, and the resulting other decompressed compression units may be combined with the first decompressed compression unit prior to data retrieval in step 780. In the event that the table comprises other data that is not stored in a compression unit, that data may also be combined with the decompressed compression unit prior to step 780. However, in some embodiments, such steps are taken only if execution of the request of step 740 also requires access to the other data in the table.

3.2. Maintaining Compatibility with Conventional Data Blocks

According to an embodiment, a database includes both data blocks that store compression units and data blocks that store uncompressed data or data that has been compressed using conventional techniques. To ensure that both types of data blocks are properly interpreted, the database server must be configured with logic to differentiate between data block rows that comprise compression units and other data block rows. The database server must further be configured to interpret data block rows that comprise compression units differently than other data block rows.

Figure 8:
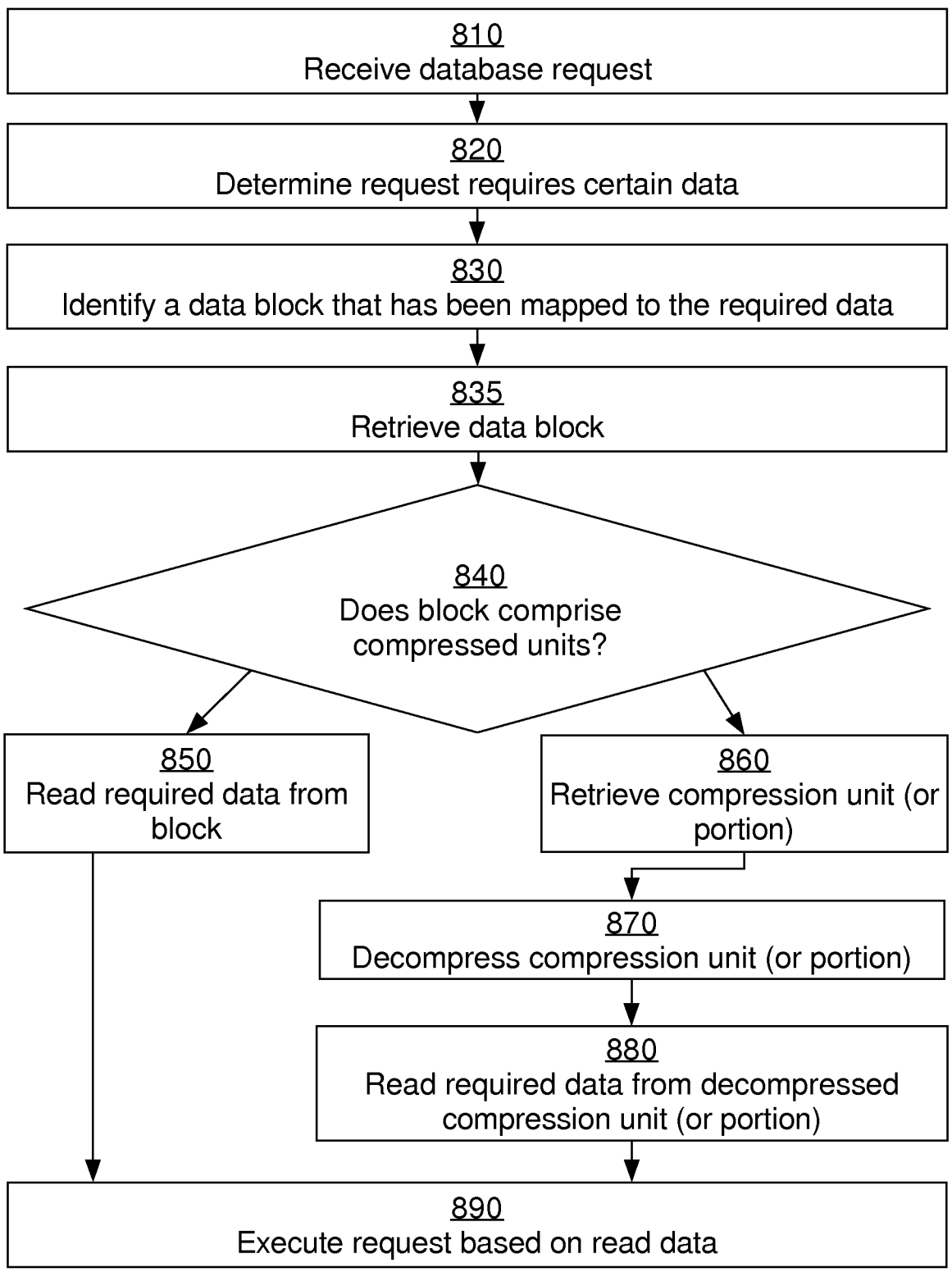
FIG. 8 is a flowchart illustrating a method for differentiating between data block rows that hold compression units and other data block rows.

FIG. 8 is a flowchart 800 illustrating a method for differentiating between data block rows storing compression units and other data block rows, according to an embodiment of the invention. The steps of FIG. 8 constitute merely one of many methods for performing this task. Other methods may include more or fewer steps in other orders than depicted in FIG. 8.

The example method of FIG. 8 assumes that a compression unit has already been stored within one or more data block rows, per, for example, steps 710-730. The example method further assumes that the database stores metadata indicating data blocks or data block rows that comprise compression units. Such metadata may have been generated, for example, in step 730. Such metadata may be, for example, a Boolean flag or other field in data block header or row header. Or, such metadata may be stored in a separate table, index, or list.

At step 810, the database server receives a request to perform a database operation, such as query or other database statement.

At step 820, the database server determines that, to respond to the request, the database server must access certain required data. For example, the request may be a query for all column values from a certain table. Or, the request may be a query for certain values from a particular table row.

At step 830, the database server searches database metadata to identify a data block or data block row that has been mapped to the required data. For example, in the case of requiring access to a table in general, the database server may consult a table index to identify a data block mapped to the table. Or, in the case of requiring access to a particular table row, the database server may consult a row index to identify a unique rowid—including a block-relative row number and an identifier for a mapped data block—by which the data for the particular table row is addressed.

At step 835, the database server retrieves the mapped data block from disk.

At step 840, the database server determines whether the database stores metadata indicating that the mapped data block (or the data block in which the mapped data block row is located) stores one or more compression units. As explained above, such metadata may be stored, for instance, as a flag or other field in the data block header.

If, at step 840, the database server determines that such metadata does not exist, then at step 850 the database server reads the required data from the mapped data block using conventional techniques, including chaining if necessary. For example, if the required data constitutes an entire table, the database server will read and interpret the raw data in each data block row. Or, if the required data constitutes only data from a particular table row, the database server will read and interpret the required data directly from the data block row whose identifier matches the row number indicated in the mapped rowid. In an embodiment, step 850 is performed without decompressing any portion of the data block row. In an embodiment, certain column values may require decompression per conventional, block-based techniques. Flow then continues to step 890 below.

If, at step 840, the database server determines that such metadata does exist, the database server assumes that the required data has been compressed in a compression unit using steps such as step 710 of FIG. 7. Thus, at step 860, the database server reads the compression unit (or a portion thereof) from the mapped data block. To do so, the database server must locate the data block row in which the compression unit is stored. Once the appropriate data block row has been identified, the database server may retrieve the compression unit (or suitable portions thereof), using techniques such as explained elsewhere in this application.

For example, if the required data is an entire table, the database server may look in the data block for metadata indicating a data block row number at which a compression unit for the table is located. Or, if the required data is a table row, the database server may access metadata indicating the addresses allocated to each compression unit in the data block. The database server may then select the data block row storing a compression unit whose allocated addresses include a match for the row identifier portion of the rowid. Note that, in most cases, the row number of the selected data block row will not match the row identifier portion of the rowid, as the row identifier in the rowid is interpreted to refer to a row compressed within the compression unit and not the data block row itself.

At step 870, the database server decompresses the compression unit (or a portion thereof), again using techniques such as explained elsewhere in this application.

At step 880, the database server reads the required data directly from the decompressed compression unit. For example, if the required data constitutes an entire table, the database server may simply read the decompressed compression unit en masse. If the required data is only a table row, the database server uses the row identifier from the rowid (minus any applicable offset) to locate the table row in the decompressed compression unit and then reads the raw data for the table row directly from the decompressed compression unit.

At step 890, once the database server has read the required data, the database server executes the request based on the read data.

3.3. Accessing Compressed Data without Decompressing the Entire Compression Unit According to an embodiment, a database server may utilize compression units more efficiently by avoiding decompression of compression unit portions that do not comprise data to which the database server requires access. Further benefits arise out of such behavior when each compression unit portion is stored in a different data block, thereby avoiding the need for the database server to read from disk those data blocks containing the portions that do not require decompression.

To facilitate this behavior, the database server may store metadata for a compression unit identifying locations at which the compressed data for certain columns or rows is held. Based on this information, whenever the database server receives a request that only asks for data from the certain rows or certain columns, the database server may determine exactly which set of portions must be decompressed, or at least one or more portions that do not comprise the data from the certain rows or columns. The database server may then avoid decompressing one or more other portions that do not comprise the data from the certain rows or columns. In some embodiments, the database server also avoids retrieving disk blocks associated with those portions.

In some embodiments, regardless of whether the portion comprises data from the certain rows or columns, the database server may nonetheless retrieve a portion of the compression unit storing metadata useful in interpreting the compression unit, such as a decompression dictionary along with metadata describing the compression algorithm used. This portion may be, for example, the first portion of the compression unit, at which may be stored a compression unit header.

According to an embodiment, an index associating certain rows and/or columns with their respective locations and sizes may be stored directly in, for example, a compression unit row header or data block row header. In an embodiment, a compression unit row header stores only metadata indicating, for each compression unit portion, the size of the portion and an address of the data block or data block row at which the portion is stored. However, the database may store metadata associating certain rows and/or columns with compression-unit relative addresses and sizes. In conjunction with the information in the compression unit row header, this information allows the database server to determine which compression unit portions store the certain rows and/or columns.

For example, returning to FIG. 3, compression unit 300 may comprise compressed data for a table comprising columns 1-30. A database server may receive a request for access to columns 6-14 of the table. Data block row 321 may include a compression unit row header indicating that compression unit is divided into three portions: portion 300a of size 7000 bytes, portion 300b, also of size 7000 bytes, and portion 300c, of size 5000 bytes. To determine which portions comprise columns 6-14, the database server may read the compression unit header for compression unit 300, which may be stored as uncompressed data in portion 300a. Based on a directory in this header, the database server may determine that the compressed data for columns 6-14 is stored at an offset of 6000 bytes, and is 4000 bytes in size. Consequently, the database server may determine that it only needs to read bytes 6000-9999 of the compression unit. Based on the compression unit row header, the database server knows that these bytes are stored in portions 300a and 300b. The database server thus decompresses only portions 300a and 300b, without decompressing portion 300c. In fact, the database server is not even required to read data block 340.

Figure 9:
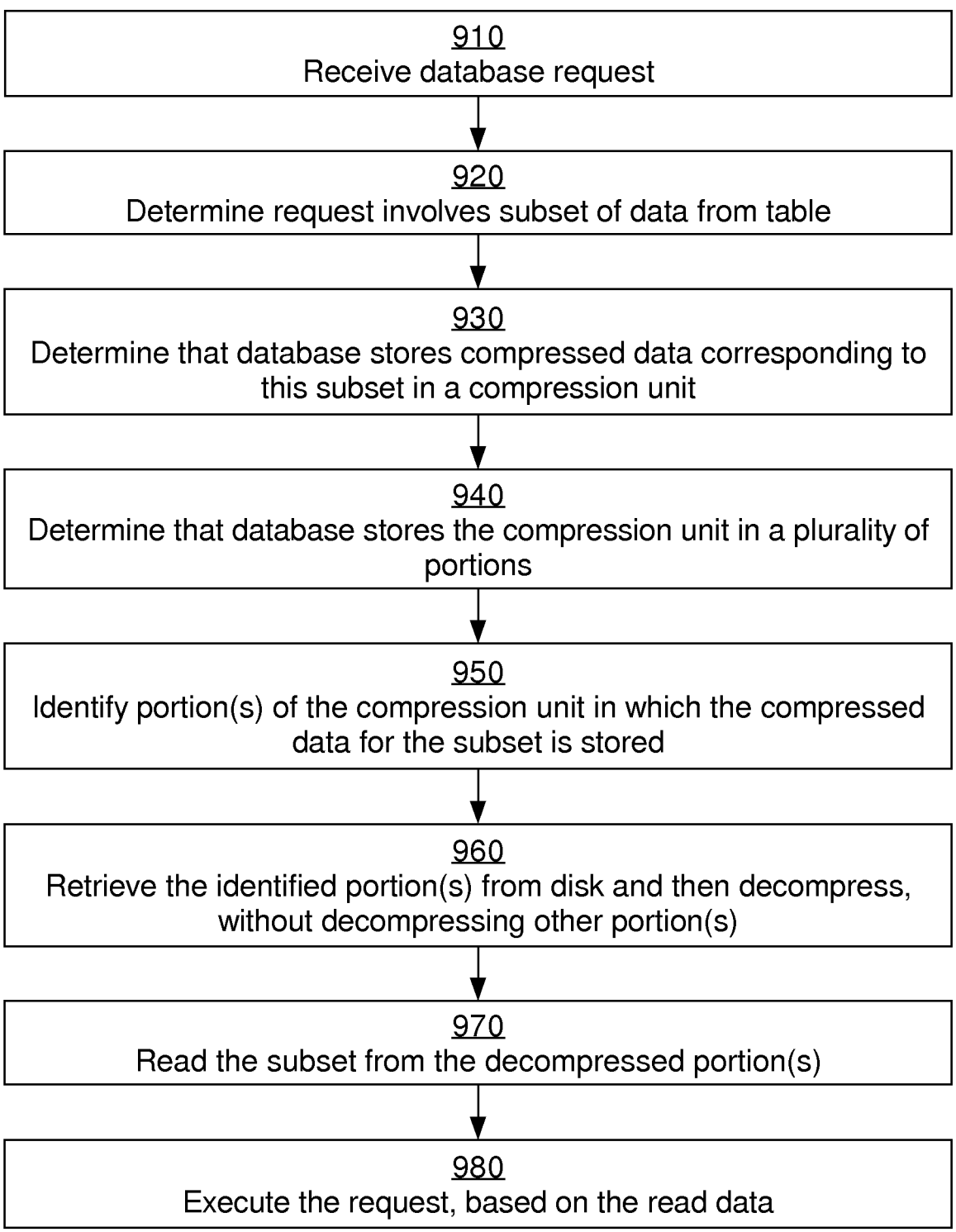
FIG. 9 is a flowchart illustrating a method for accessing data that has been compressed in a compression unit without decompressing at least one portion of the compression unit.

FIG. 9 is a flowchart 900 illustrating a method for accessing data that has been compressed in a compression unit, without decompressing at least one portion of the compression unit. The steps of FIG. 9 constitute merely one of many methods for performing this task. Other methods may include more or fewer steps in other orders than depicted in FIG. 9.

The example method of FIG. 9 assumes that a compression unit has already been stored as multiple portions in multiple data block rows, per, for example, steps 710-730. The example method further assumes that the database stores metadata indicating the compression unit portion or portions in which data for certain rows and/or certain columns resides, using techniques such as explained above.

At step 910, a database server receives a request, such as a query or other database statement.

At step 920, the database server determines that execution of the request requires access to a subset of data in a table. The required data may be, for instance, a subset of column values for certain rows in a table.

At step 930, the database server determines that the database stores compressed data corresponding to this required data in a compression unit. For example, upon inspecting the data block at which the database indicates the required data is located, the database server may determine that the data block stores compression units.

At step 940, the database server determines that the database stores the compression unit in a plurality of portions. This determination may occur on the basis of, for example, metadata in a row header or compression unit row header.

At step 950, the database server may identify a first set of one or more portions of the compression unit in which the compressed data for the required data is stored. The database server may accomplish this step by, for example, analyzing metadata that describes the sizes and locations of certain rows, columns, and/or portions, as explained above.

At step 960, the database server may retrieve the first set of one or more portions of the compression unit from disk and then decompress the first set of one or more portions of the compression unit using techniques such as described in the sections above, thereby producing a set of one or more decompressed portions of the compression unit.

At step 970, the database server reads the required data in the set of one or more decompressed portions of the compression unit.

At step 980, the database server executes the request, based on at least one or more items in the read data.

The compression unit involved in this method also contains a second set of one or more portions that is different from the first set of one or more portions. Steps 910-980 are performed without decompressing this second set of one or more portions.

3.4. Predicate Filtering Optimizations

According to an embodiment, a database server may store metadata indicating, for some or all portions of a compression unit, a range of values for some or all of the columns of the table rows stored therein. This metadata may be stored in any of the locations discussed herein, including data block headers, row headers, and/or a system table. For each particular column for which a range is specified in metadata associated with a particular compression unit portion, the metadata indicates that no table row in the particular portion of the compression unit comprises a value that is outside of the range. The range may be defined, for example, by minimum and maximum values.

When the database server receives a request for data from a table in a compression unit, the database server may utilize this metadata to assist in evaluation of any predicates associated with columns for which ranges have been specified. Based on the predicate and the metadata, for example, the database server may easily determine whether a particular compression unit stores any rows that match the predicate. If any rows in a portion could possibly match the predicate, the compression unit should be decompressed; otherwise, the database server can avoid decompression of the compression unit.

Such metadata may be useful, for example, where compression unit portions have been divided based upon range partitioning of a certain column, such as a primary key. For example, metadata for a compression may specify that a column "ID" of a certain compression unit portion ranges from 100 to 200. If the database server receives a request that includes a predicate specifying ID=345, the database server may safely ignore the compression unit portion. However, if the database server receives a request that includes a predicate ID<150, the database server will need to decompress the compression unit.

In an embodiment, metadata may also or instead specify a set of enumerated values possessed by certain columns of table rows in a compression unit portion.

3.5. Selective Decompression of Retrieved Compression Unit Portions

In an embodiment, the database server may further perform yet another level of selection after it has already retrieved compression unit portions from disk, in that it may selectively decompress only certain bytes of a retrieved compression unit or compression unit portions. For example, the database may discover that, after decompressing the first 1000 bytes of a compression unit portion, it has already decompressed all of the rows necessary to respond to the request. Thus, the database server does not decompress the remaining bytes in the compression unit portion. Selective decompression of retrieved compression unit portions may also be based on metadata within the compression unit portion permitting random access to compressed data for various table rows.

Because embodiments of the invention may employ this level of selective decompression, the act of decompressing only a part of a retrieved compression unit or portion should be understood to constitute the act of decompressing a compression unit or portion as referred to herein.

If a later operation hits a retrieved compression unit portion that is only partly decompressed while the compression unit portion is still in cache, and the later operation requires access to additional data in the compression unit portion that has not been decompressed, the later operation may selectively decompress the additional data as well. The additional data may then be buffered along with the originally decompressed data from the compression unit portion.

3.6. Deleting Table Rows that have been Compressed

In an embodiment, prior to deleting a table row, a database server is configured to check for metadata indicating that a data block or data block row header comprises a compression unit. If no such metadata exists, the database server simply takes normal measures to delete the table row, such as setting a deleted flag in the data block row header for the table row. However, if such metadata exists, the database server does not make any changes to the data block row header, as doing so will effectively delete the entire compression unit. Instead, the database server is configured to mark the row as deleted in the uncompressed header of the compression unit itself. In an embodiment, the database server is configured to rebuild the compression unit, with the indicated table row having been deleted.

3.7. Locking Table Rows that have been Compressed

In an embodiment, when locking a table row, a database server sets locking metadata for the entire data block row, effectively locking the entire compression unit. Locking the entire compression unit may be especially desirable in compression units with more complex compression, where it may be impossible to isolate data for just one table row. However, in other embodiments, the database server maintains locking metadata for each table row compressed in the compression unit. In an embodiment, the database server instead maintains separate locks for every row in the compression unit.

3.8. Accessing Multiple Portions of a Compression Unit in a Single Read Operation According to an embodiment, the compression unit row header may include metadata indicating contiguous blocks that store chained portions of the compression unit. For example, a compression unit row header at block 29 may indicate that blocks 30-40 also include portions of the compression unit. Since these blocks are contiguous, the database server may utilize this information to fetch all of data blocks 30-40 in a single read operation. Without such information, the database server may have instead been required to read block 29, look for a pointer indicating the next block in the chain (in this case 30), read block 30, look for a pointer to the next block in the chain (in this case 31), and so on down the chain.

4.0. Miscellaneous

In an embodiment, a method comprises: storing data from table rows in a table into a compression unit; storing at least a portion of the compression unit in a data block row of a data block in a database; wherein the portion of the compression unit comprises compressed data from a plurality of table rows from the table; wherein the method is performed by one or more computing devices.

In an embodiment, the data block comprises a header and one or more data block rows, the one or more data block rows including the data block row that stores the compression unit, wherein the data block row comprises a row header and a column field, wherein the column field comprises said portion of the compression unit. In an embodiment, the method further comprises: determining that execution of a request requires access to first data in said table; retrieving, from the data block row, the portion of the compression unit; decompressing the portion of the compression unit, thereby yielding an decompressed portion of the compression unit; locating the first data in the decompressed portion of the compression unit; executing the request, based at least partially on one or more items from the first data. In an embodiment, the method further comprises: storing the decompressed portion in a re-usable buffer. In an embodiment, the data is a subset of the table, said subset including first data from a first set of one or more columns of the table, but not including second data from a second set of one or more columns of the table. In an embodiment, the portion of the compression unit is a first portion of the compression unit; the data block row of the data block is a data block row of a first data block; and the method further comprises: storing a second portion of the compression unit in a data block row of a second data block. In an embodiment, the method further comprises: determining that execution of a request requires access to first data in the table; retrieving, from data block rows in each of a set of data blocks, a set of portions of the compression unit; wherein the set of data blocks includes the first data block and the second data block; wherein the set of portions includes the first portion and the second portion, decompressing the set of portions, thereby yielding a decompressed set of portions; locating the first data in the decompressed set of portions; executing to the request, based at least partially on one or more items from the first data.

In an embodiment, the method further comprises: storing metadata describing properties of the compression unit. In an embodiment, the metadata is stored within the data block in a field of the data block row that precedes the portion of the compression unit. In an embodiment, the method further comprises: determining how to retrieve the data stored into the compression unit based at least in part on the metadata. In an embodiment, the metadata includes metadata indicating a data block address for each portion of the compression unit.

In an embodiment, the method further comprises: storing first metadata indicating that the data block consists of compressed data, wherein the database further stores second metadata indicating that one or more other data blocks consist of non-compressed data. In an embodiment, the method further comprises: storing second data from table rows in a second table into a second compression unit; storing at least a portion of the second compression unit in a different data block row of the data block in the database; wherein the portion of the second compression unit comprises compressed data from a plurality of table rows from the second table. In an embodiment: the plurality of table rows is compressed inside of the compression unit, the method further comprising: storing uncompressed data in a different data block row of the data block; storing metadata in the data block indicating a) that the data block row storing the compression unit stores compressed data; and b) that the different data block row stores uncompressed data. In an embodiment, the method further comprises: storing metadata indicating, for the portion of the compression unit, a range of values for a particular column, wherein no table row in the portion of the compression unit comprises a value for the particular column that is outside of the range; receiving a request for data from the table, said request including a predicate based upon the particular column; in response to the request, determining whether to decompress the portion of the compression unit based upon the metadata and the predicate.

In an embodiment, a method comprises: determining that execution of a database request requires access to at least one or more items in a table row; retrieving a data block to which the table row has been mapped; determining whether the table row is stored in one or more compression units; and if the table row is stored in one or more compression units, then: based at least partially on information in the data block, locating at least a portion of the compression unit in a data block row of the data block, decompressing the portion of the compression unit, thereby yielding a decompressed portion of the compression unit; wherein the decompressed portion of the compression unit comprises data from a plurality of table rows; locating the table row in the decompressed portion of the compression unit; reading the one or more items from the table row; and executing the database request based on the one or more items; wherein the method is performed by one or more computing devices.

In an embodiment, the method further comprises, if the table row is not stored in one or more compression units, then: locating within the data block a data block row storing raw data for the table row; reading the one or more items from the data block row; and executing the database request based on the one or more items. In an embodiment, the portion of the compression unit comprises the entire compression unit. In an embodiment, the decompressed portion of the compression unit comprises an entire table. In an embodiment, the portion of the compression unit is at least partially located in another data block. In an embodiment, the step of retrieving the data block comprises locating, in an index, an entry associating the table row with a) an address of the data block and b) a row identifier; the step of retrieving the data block further comprises locating the data block based on the address of the data block; and the step of locating the table row in the decompressed portion of the compression unit is based on the data block row identifier; wherein the data block row is associated with a data block row identifier; wherein the data block row identifier is not the same as the row identifier.

In an embodiment, a method comprises: receiving a request whose execution requires access to first data from a table in a database; determining that the database stores the first data in a compression unit; determining that the database stores the compression unit in a plurality of portions; decompressing a first set of one or more portions of the compression unit, thereby yielding one or more decompressed portions of the compression unit; locating the first data in the decompressed portion of the compression unit; executing the request based at least partially on one or more items from the first data; wherein the method is performed without decompressing a second set of one or more portions of the compression unit; wherein the method is performed by one or more computing devices.

In an embodiment, the method further comprises: identifying the first set of one or more portions of the compression unit, based at least partially on metadata indicating that the first data is stored in certain portions of the compression unit. In an embodiment, each of the plurality of portions is stored in a separate data block of a plurality of data blocks. In an embodiment, the method further comprises: identifying the first set of one or more portions of the compression unit, based at least partially on portion mapping data stored immediately preceding a particular portion of the compression unit within a first data block of said plurality of data blocks, said portion mapping data indicating, for each portion of the plurality of portions, a block at which the portion is located.

5.0. Example Compression Units 5.1. Compressed and Uncompressed Sections

FIG. 11 is a block diagram of a compression unit 1100 according to one embodiment. In the embodiment illustrated in FIG. 11, compression unit 1100 has two primary sections: an uncompressed section 1102 and a compressed section 1104. In general, the uncompressed section 1102 includes metadata about the contents and format of the compressed section 1104. Uncompressed section 1102 may indicate, for example, what compression technique (if any) was used to compress the contents of the compressed section 1104, and how the contents of uncompressed section 1102 are organized.

For example, assume that compression unit 1100 is used for storing tabular data from the table 1200 that is illustrated in FIG. 12. Table 1200 has three columns A, B, C and ten rows R1-R10. For the purpose of explanation, assume that all of the data from Table 1200 is stored in compression unit 1100, and that compression unit 1100 is both a top-level compression unit (has no parent) and a bottom-level compression unit (has no children). Under these circumstances, the uncompressed section 1102 of compression unit 1100 may simply include:

an indication of the compression technique (if any) used to compress the contents of compressed section 1104; and an indication that compression unit 1100 is a bottom-level compression unit (and therefore has no children).

While these two pieces of information may be sufficient to allow use of compression unit 1100, alternative embodiments include several additional pieces of metadata to provide greater flexibility and extensibility. For example, in one embodiment, within any compression unit, tabular data may be stored in column-major format or row-major format. When stored in row-major format, the tabular data would be stored within compressed section 1104 in the sequence IMAGE1A, NAME1, IMAGE1C, IMAGE2A, NAME2, IMAGE2C, etc. On the other hand, when stored in column-major format, the tabular data would be stored within compressed section 1104 in the sequence IMAGE1A, IMAGE2A, IMAGE3A . . . NAME1, NAME2, NAME3 . . . IMAGE1C, IMAGE2C, IMAGE 13C, etc. In an embodiment that allows the column-major/row-major selection to be made on a compression-unit-by-compression-unit basis, uncompressed section 1102 may further include an indication of whether the tabular data contained in the compressed section 1104 is stored in row-major or column-major format. In one embodiment, to conserve space, a compression unit does not include the names of the columns whose data is contained in the compression unit. Further, a compression unit may or may not store the rowids of the rows whose data is contained in the compression unit.

5.2. Recursive Structure

As mentioned above, embodiments shall be described herein in which compression units are recursive structures. Thus, a compression unit may have a parent compression unit and any number of child compression units. In the example given above, compression unit 1100 did not have any child compression units. However, in situations in which compression unit 1100 has child compression units, the compression unit 1100 may include a header that has information about the child compression units. The header for compression unit 1100 may be stored in the uncompressed section 1102, or split between the uncompressed section 1102 and the compressed section 1104.

Figure 13:
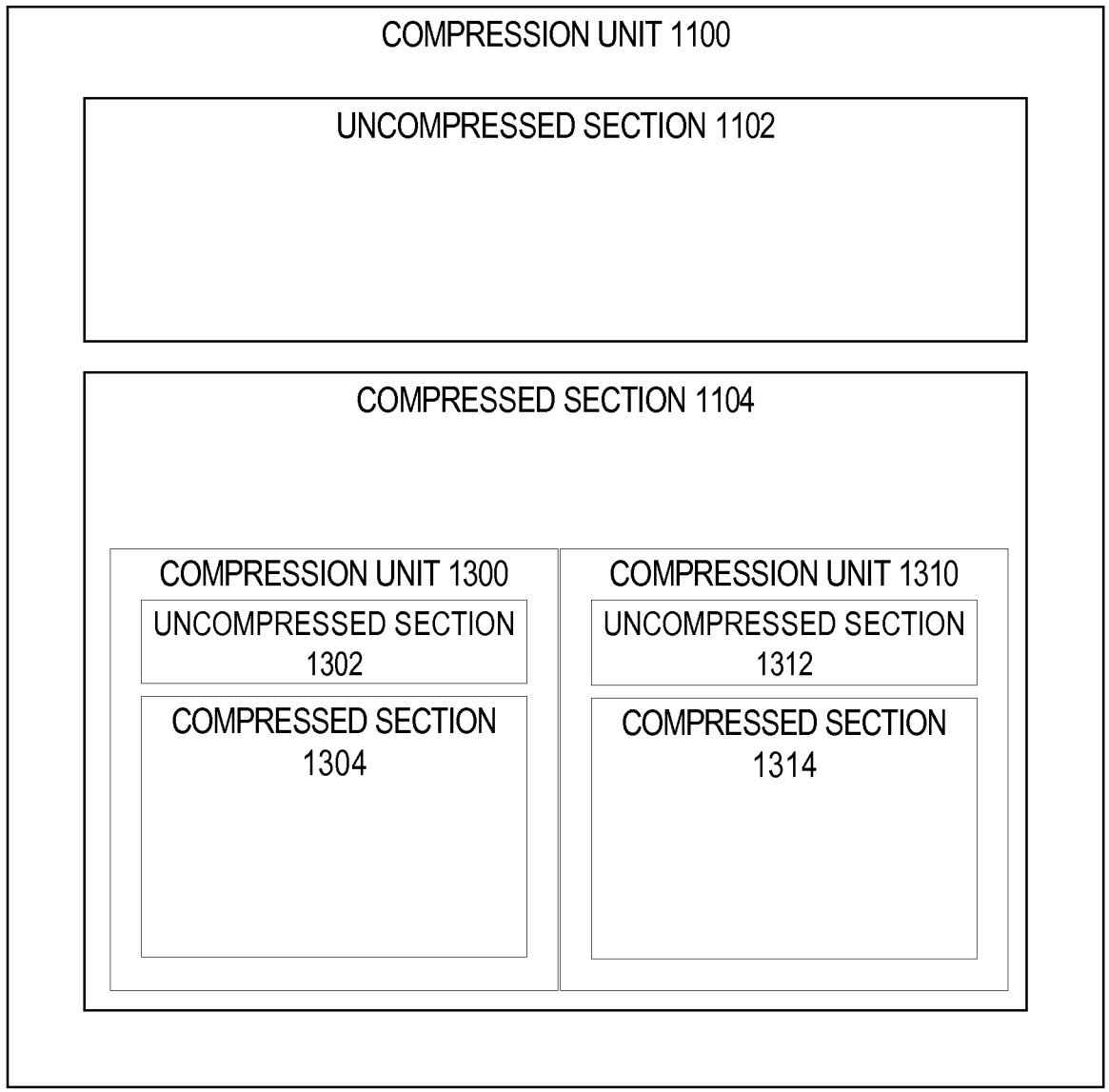
FIG. 13 is a block diagram showing two levels of compression units, according to an embodiment of the invention.

In the situation illustrated in FIG. 13, compression unit 1100 has two child compression units 1300 and 1310. As illustrated, child compression units 1300 and 1310 have the same general structure as their parent compression unit 1100. That is, similar to compression unit 1100, child compression units 1300 and 1310 include uncompressed sections and compressed sections. Further, compression units 1300 and 1310 reside entirely within the compressed section 1104 of their parent compression unit 1100. Consequently, whatever compression is applied by to compressed section 1104 at the level of compression unit 1100 applies to the entirety of compression units 1300 and 1310.

Because the compression of parent compression units applies to the entirety of their child compression units, even the uncompressed sections 1302 and 1312 of child compression units may in fact be compressed. Thus, the "uncompressed" section of a compression unit is only uncompressed relative to the level in which the section resides (but may be compressed based on compression applied at higher level compression units). In contrast, the compressed section of a compression unit is compressed relative to the level in which the section resides (in addition to any compression applied at higher level compression units).

According to one embodiment, when compression unit 1100 is the parent of one or more child compression units, the header of compression unit 1100 includes additional information. For example, in one embodiment, the header of compression unit 1100 indicates (a) an offset at which each child compression unit begins, and (b) which data is contained in each child compression unit.

For example, assume that a particular compression technique CT1 is particularly good at compressing images. Under these circumstances, it may be desirable to compress the images in columns A and C of table 1200 using compression technique CT1, while compressing the strings of column B with a different compression technique CT2. To achieve this compression combination using the two child compression units 1300 and 1310, compression unit 1300 may be used to store the images from columns A and C, while compression unit 1310 is used to store the strings from column B. This distribution of data is illustrated in FIG. 14

Figure 14:
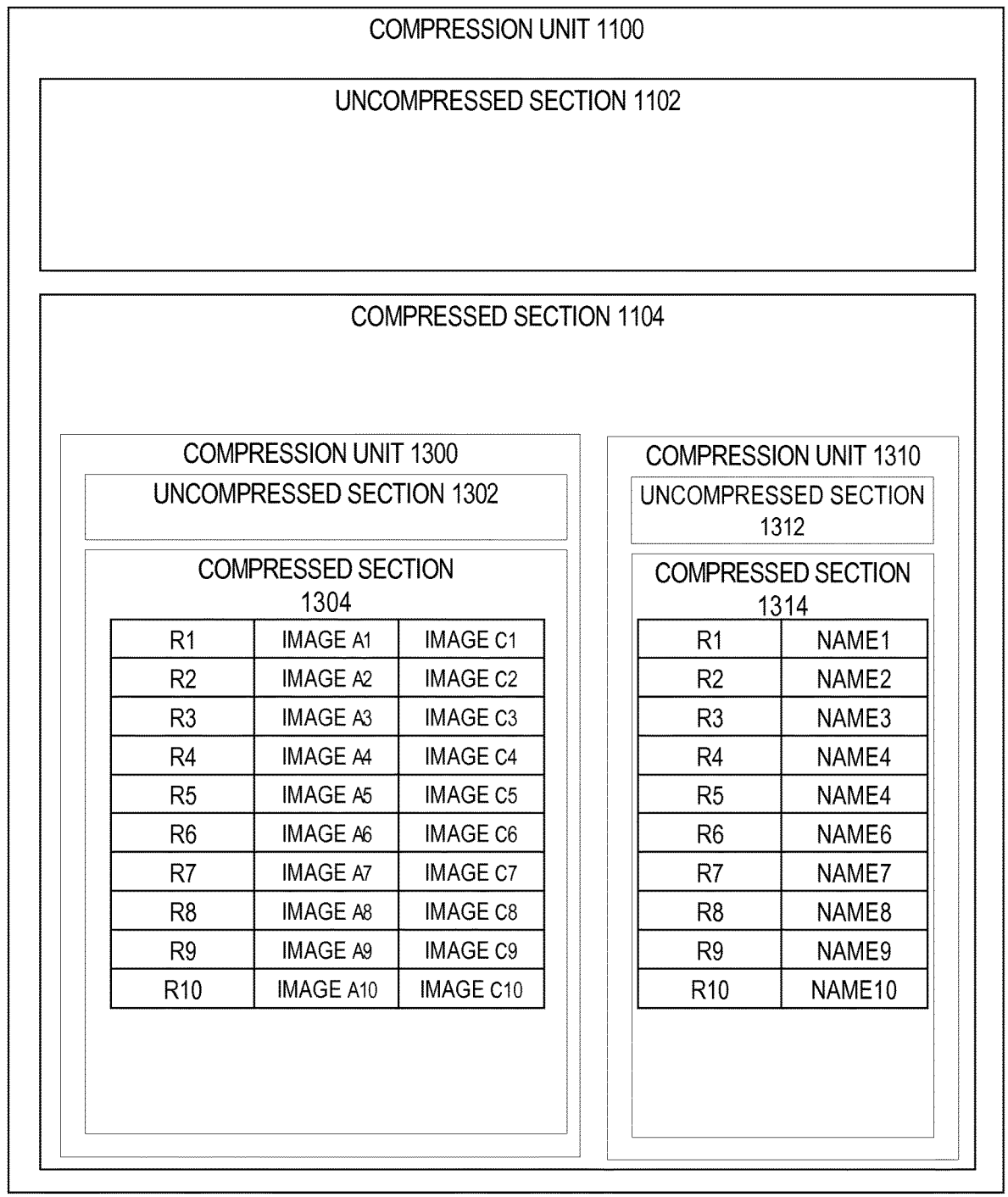
FIG. 14 is a block diagram showing how tabular data from the table illustrated in FIG. 12 may be stored in the compression units illustrated in FIG. 13.

According to one embodiment, to indicate the distribution of data illustrated in FIG. 14, the header of the parent compression unit 1100 would indicate that the data within compressed section 1104 is stored in column-major format, and that columns A and C are stored in compression unit 1300 while column B is stored in compression unit 1310. The uncompressed section 1302 of compression unit 1300, in turn, would indicate that compression technique CT1 applies to compressed section 1304. Similarly, the uncompressed section 1312 of compression unit 1310 would indicate that compression technique CT2 applies to compressed section 1314.

Figure 15:
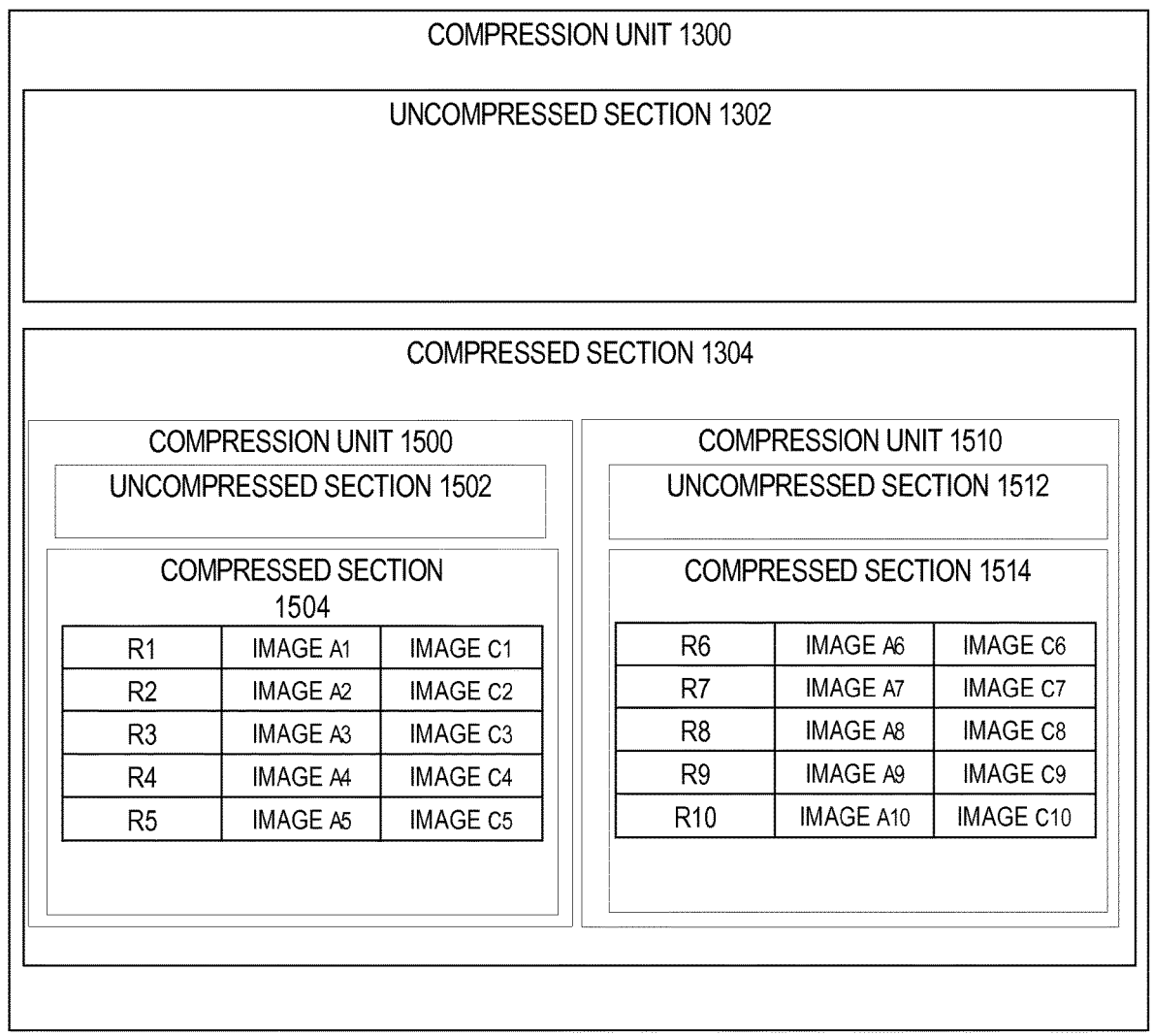
FIG. 15 is a block diagram illustrating how child compression units may themselves have child compression units, according to an embodiment of the invention.

Because of the recursive nature of compression units, the compression units 1300 and 1310 may themselves be parents to one or more child compression units. For example, in FIG. 15, compression unit 1300 is shown as having two child compression units 1500 and 1510. Compression unit 1500 stores the images from columns A and C for rows R1 to R5, while compression unit 1510 stores the images from columns A and C for rows R6 to R10. Because the data within compressed portion 1304 is distributed between compression units 1500 and 1510 based on rows, the uncompressed section 1302 of compression unit 1300 would indicate that, at the level of compression unit 1300, the tabular data is organized in row-major format.

In this example, compression units 1500 and 1510 are bottom-level compression units that are two levels below the top-level compression unit 1100. On the other hand, compression unit 1310 is a bottom-level compression unit that resides one level below the top-level compression unit 1100. Thus, in one embodiment, bottom-level compression units that store tabular data for the same table may be at different depths, depending on how the tabular data has been spread among compression units.

5.3. Metadata Describing Internal Organization of Compression Units

Because the information within compression units may be organized in a virtually infinite number of ways, metadata is maintained to indicate how each compression unit is organized. Depending on the implementation, the metadata about the organization of tabular data within a compression unit may be stored external to the compression unit, or within the compression unit. When stored within the compression unit, the metadata may be stored in the uncompressed section, the compressed section, or divided between both. The actual manner in which the metadata is stored may vary from implementation to implementation.

Figure 16:
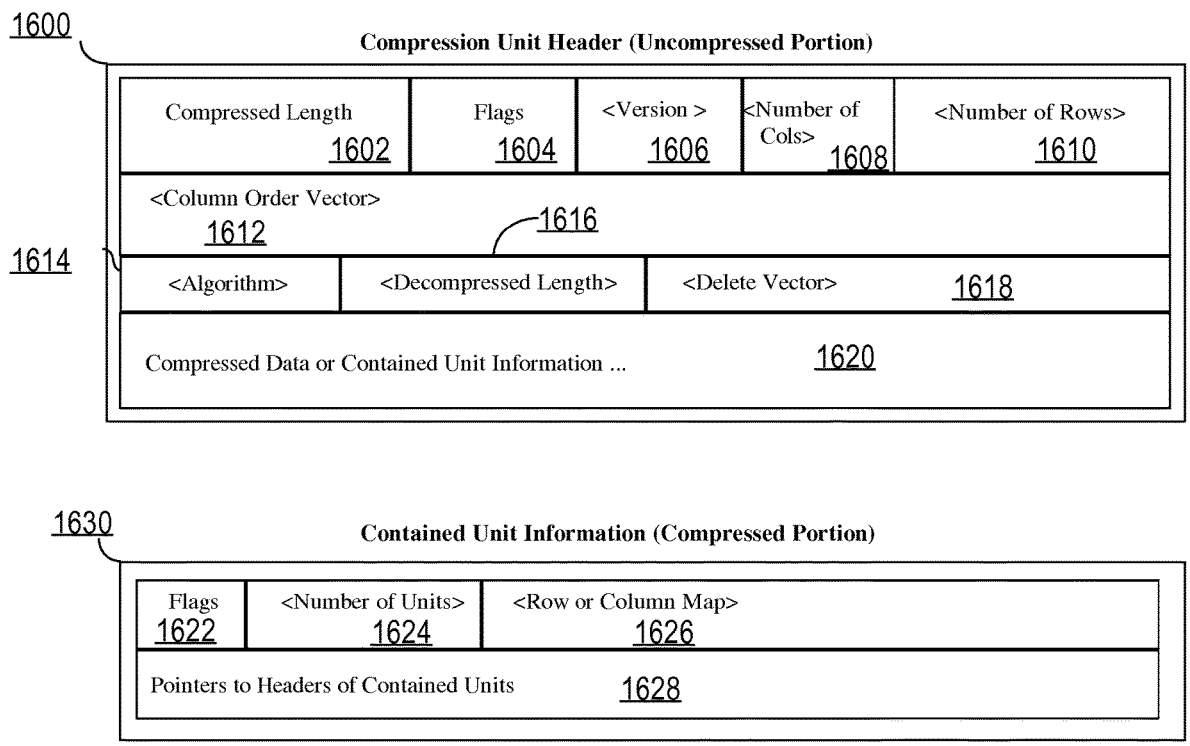
FIG. 16 is a block diagram illustrating how a compression unit header is split into two portions, one of which is uncompressed and one of which is compressed, according to an embodiment of the invention.

According to one embodiment, the metadata that describes the organization of tabular data within a compression unit is stored in a header within the compression unit, and includes both an uncompressed header portion 1600 and a compressed header portion 1630, as illustrated in FIG. 16. It should be understood that the embodiment illustrated in FIG. 16 is merely one example of how the uncompressed header portion 1600 may be organized, and the types of metadata that the uncompressed header portion 1600 may contain.

In the embodiment illustrated in FIG. 16, the initial "length" field 1602 stores metadata that indicates the compressed size of the compression unit. In this context, the "compressed size" means the amount of storage occupied by the compression unit before any data contained there is decompressed. However, some compression units may not actually compress data. In such cases, the "compressed size" would be the same as the uncompressed size.

In the embodiment illustrated in FIG. 16, the length field 1602 is followed by a series of flags 1604. The flags 1604 indicate whether or not the header contains certain fields. When the flag associated with a field indicates that the field is not present, then the field is either not relevant to the particular compression unit, or some "default" value is assumed for the field. The flags 1604, and their corresponding fields, shall be discussed hereafter in greater detail.

5.4. Example Flags and Fields

According to one embodiment, flags 1604 include a flag that indicates whether a version number field 1606 is present in the header. The version number field 1606 may be used in situations where the application that is managing the tabular structure (e.g. a spreadsheet program, word processor, or relational database system) supports versioning. In systems that support versioning, the version number field 1606 is used to store a value that indicates the version of the tabular data contained within the compression unit. According to one embodiment, it is assumed that child compression units are associated with the same version as their parents, so the version number field 1606 need only be used in top-level compression units.

In one embodiment, flags 1604 include a flag indicates whether the compression unit includes fields relating to child compression units. In the embodiment illustrated in FIG. 16, such fields include the "contained unit information" stored within the compressed header portion 1630. If a compression unit is a bottom-level compression unit, then the compression unit will not have any child compression units, and therefore will not have nor require any header fields relating to child compression units.

In one embodiment, flags 1604 include a flag that indicates whether the header contains a column order vector 1612. If the flag is false, then it is assumed that the columns are organized within the compression unit in the same column order as the "parent column order". For child compression units, the parent column order is the column order specified by its parent compression unit. For top-level compression units, the column order is the column order defined by the tabular structure itself.

For example, the column order defined for table 1200 is A, B, C. Therefore, the parent column order for compression unit 1100, which is a top-level compression unit, is A, B, C. If the column order flag for compression unit 1100 is false, then it would be assumed that the column order within compression unit 1100 is A, B, C. However, as illustrated in FIG. 14, within compression unit 1100 the columns are ordered A, C, B (where columns A and C are stored in child compression unit 1300. Thus, for compression unit 1100, the column order flag would be true, and compression unit 1100 would have a column order vector 1612 to indicate that the mapping between the parent column order A, B, C and the new column order A, C, B.

The column order vector 1612 may indicate the mapping between column orders in a variety of ways. According to one embodiment, the positions in the column order vector 1612 correspond to the columns in the parent column order. Thus, the first, second and third positions within the column order vector 1612 correspond to columns A, B, and C, respectively. However, the values stored at those positions in the column order vector 1612 indicate the new order of the columns. For example, in the new column order (A, C, B) imposed by compression unit 1100, column A is still the first column. Thus, the first position of the column order vector would store a "1".

On the other hand, in the new column order (A, C, B) imposed by compression unit 1100, column B is now third in the sequence. Consequently, the second position in the column order vector 1612 would store the value "3".

Finally, in the new column order (A, C, B) imposed by compression unit 1100, column C is now second in the sequence. Consequently, the third position in the column order vector 1612 would store the value "2".

Thus, the column order vector "1, 3, 2" within compression unit 1100 would indicate that compression unit 1100 has changed the order of the columns from the parent column order A, B, C, to the new column order A, C, B.

Metadata that remaps the parent column order in this manner is merely one example of metadata that may be used to indicate the column sequence used within a compression unit. Numerous alternatives may be used. For example, the header may simply store a sequence of column identifiers, where the column identifiers uniquely identify columns and the sequence of the identifiers indicates the sequence of the column data within the compression unit.

According to one embodiment, flags 1604 include an "uncompressed" flag that indicates whether the unit is compressed or uncompressed. If the uncompressed flag is true, then the "compressed portion" of the compression unit is not actually compressed at the current level. However, as pointed out above, even an "uncompressed" compression unit may be compressed if it is the descendent of any compression unit that does apply compression. Similarly, an "uncompressed" compression unit may store data in child compression units that do apply compression. Thus, the uncompressed flag only indicates whether compression occurs relative to the level of the compression unit to which the flag belongs.

If the uncompressed flag is true, then the header of the compression unit will not have a compression algorithm field 1614. On the other hand, if the uncompressed flag is false, then the header of the compression unit will include a compression algorithm field 1614. When present, the compression algorithm field 1614 indicates the compression algorithm that was used to compress the compressed section of the compression unit.

The compression algorithm used to compress the compressed section of a compression unit is distinct from any compression that may be applied by any parent compression unit, and from any compression that may be applied by any child compression unit. For example, the header of compression unit 1100 may indicate that compression technique X was used to compress compressed section 1104 of compression unit 1100. The header of compression unit 1300 may indicate that compression technique Y was used to compress compressed section 1304 of compression unit 1300. Finally, the header of compression unit 1310 may indicate that the compressed section 1314 of compression unit 1310 is actually uncompressed. Under these conditions, the data within compressed section 1304 will actually be double compressed, first as part of compressed section 1304 using compression technique Y, and then as part of compressed section 1104 using compression technique X.

In one embodiment, metadata indicating the decompressed length of compressed data is also stored in the header of the compression unit.

In one embodiment, flags 1604 include a "number-of-columns" flag that indicates whether the unit contains information on the number of columns contained in the unit. The number-of-columns flag may be false, for example, if the compression unit has exactly the same number of columns as its parent. For top-level compression units, the number-of-columns flag may be false if the compression unit contains all of the columns of the spreadsheet and/or table for which the compression unit is storing tabular data.

In the example illustrated in FIG. 14, the number-of-columns flag of compression unit 1100 would be false because compression unit 1100 has all of the columns of table 1200. However, the number-of-columns flag of compression units 1300 and 1310 would both be true, because they do not have the same number of columns as their parent compression unit 1100.

In one embodiment, flags 1604 include a number-of-rows flag that indicates whether the unit contains information on the number of rows contained within the compression unit. Similar to the number-of-columns flag, the number-of-rows flag may be false if (a) the compression unit stores all of the rows of its parent compression unit, or (b) the compression unit is a top-level compression unit that stores all of the rows of the spreadsheet and/or table for which the compression unit is storing tabular data.

In the example illustrated in FIG. 14, the number-of-rows flag of compression units 1100, 1300 and 1310 would all be false, because all of them have all rows of table 1200. However, in compression units 1500 and 1510 of FIG. 15, the number-of-rows flag would be true, because compression units 1500 and 1510 have subsets of the rows of their parent compression unit 1300.

In one embodiment, flags 1604 include a flag that indicates whether there is a delete vector field 1618 in the header. As shall be described in greater detail hereafter, the delete vector field 1618 may be used to store a delete vector that indicates that information has been deleted from the compression unit, without actually deleting the corresponding data.

In one embodiment, flags 1604 include a checksum flag that indicates whether there are row checksums in the compression unit. Row checksums may be used to determine whether data has become corrupted. However, row checksums consume space, and therefore may be omitted under some situations or implementations.

In one embodiment, flags 1604 are extensible. Consequently, new flags may be added to flags 1604 as needed.

5.5. Contained Unit Information

If a compression unit contains no smaller units, then the (compressed) data for the unit is at the start of the compressed section of the unit, immediately following the compression unit header 1600. On the other hand, if the compression unit does contain lower-level units, then instead of starting with the data, the compressed section of the unit starts with a (compressed) data structure with information on the contained units. One embodiment of such a contained units structure is illustrated in FIG. 16 as contained unit information 1630.

In the illustrated embodiment, the contained unit information 1630 starts with flags 1622. In one embodiment, the first flag indicates whether the unit is divided based on rows or columns. The second flag indicates whether there is one column per unit. Thus, if contained unit information 1630 is for a compression unit that contains three columns A, B and C, and each of the columns is in a different child compression unit, then the first flag of flags 1622 would indicate that the data is divided based on columns, and the second flag of flags 1622 would indicate that there is one column per child compression unit.

On the other hand, if contained unit information 1630 is for a compression unit that contains three columns A, B and C, but columns A and C are in the same child compression unit, then the first flag of flags 1622 would indicate that the data is divided based on columns, and the second flag of flags 1622 would indicate that there is not one column per child compression unit.

In the illustrated embodiment, the flags 1622 are followed by a number of units field 1624. The number of units field 1624 indicates the number of child compression units. While the illustrated embodiment includes a number of units field 1624, such a field need not be present in alternative embodiments.

The number of units field 1624 is followed by a map 1626 either from rows to units, or from columns to units, depending on whether the data is divided by rows or by column. For example, map 1626 for compression unit 1100, illustrated in FIG. 14, would indicate that columns A and C are stored in child compression unit 1300, and that column B is stored in child compression unit 1310. On the other hand, map 1626 for compression unit 1300, illustrated in FIG. 15, would indicate that rows R1-R5 are stored in child compression unit 1500, and that rows R6-R10 are stored in child compression unit 1510.

According to one embodiment, in both column major and row major situations, the map 1626 is a vector with length equal to the number of contained units. In one embodiment, each entry in the vector is the number of rows or columns in the corresponding child compression unit. Thus, if the column map has entries 2, 5 and 3, then the first unit contains the first two columns in the order specified previously in the header, and then the second unit contains the next five columns, and the third unit contains the next three columns. If there is one column per unit, then both the number of units and column mapping may be eliminated.

The contained unit information 1630 concludes with pointers 1628 to the headers of each of the contained compression units. According to one embodiment, these pointers are relative to the start of the uncompressed unit. The pointers are relative to the start of the uncompressed unit because, in order to make use of the contained unit information 1630, including the pointers 1628, the compressed section of the compression unit would have already been uncompressed.

5.6. Obtaining Tabular Data Stored in Compression Units

The recursive nature of compression units allows tabular data to be compressed at each of many levels. For example, within a bottom-level compression unit, data may be compressed using run-length encoding. That bottom-level compression unit may be a child of an intermediate-level compression unit that compresses the bottom-level compression unit (and everything else in its compressed section) using LZO compression. That intermediate-level compression unit may be a child of a top-level compression unit that compresses the intermediate-level compression unit (and everything else in its compressed section) using BZIP2 compression.

To obtain tabular data, the various compression operations have to be undone in reverse chronological order. In the example given above, the data must be decompressed using BZIP2 decompression, then decompressed using LZO decompression, and then uncompressed using run-length decoding. Because each decompression operation consumes resources, some operations may be performed directly on compressed data (without decompressing it). Eg: Run Length encoding. In situations where decompression is necessary, it is desirable to only perform the decompression operations necessary for any particular operation.

For example, assume that a request is made for the names associated with rows R1 to R10 of table 1200. As illustrated in FIG. 14, those names are in column B, which is stored in child compression unit 1310. Thus, to obtain the names, the compressed section 1104 would be decompressed. Once decompressed, the contained unit information within compressed section 1104 can be read to determine that column B is stored in compression unit 1310. The pointer to compression unit 1310 is follow to find the header for compression unit 1310. The header, which is stored in uncompressed section 1312, contains metadata that indicates how compressed section 1314 was compressed. Compressed section 1314 may then be uncompressed to obtain the names.

Significantly, during the process of obtaining the names from column B, the compressed section 1304 of compression unit 1300 was not uncompressed, because compressed section 1304 did not have any data or metadata necessary to obtain the names from rows R1 to R10. Conversely, if the request was for images and not names, compressed section 1304 of compression unit 1300 would have to be decompressed, while compressed section 1314 of compression unit 1310 would not be decompressed.

5.7. Mixing Compressed and Uncompressed Data

According to one embodiment, the system may store data in compression units in uncompressed form or in compressed form. The system may, based on how many rows are in the compression unit, or based on the compressibility of the data, choose not to compress the compression unit.

According to one embodiment, a table may contain compression units and rows which are stored external to compression units. A row may be stored in conventional row-major disk blocks, or a row-based compression technique, such as the technique described in U.S. patent application Ser. No. 11/875,642 entitled "ON-LINE TRANSACTION PROCESSING (OLTP) COMPRESSION AND RE-COMPRESSION OF DATABASE DATA" filed on Oct. 19, 2007, the entire contents of which are incorporated herein by reference. When some tabular data for a table is stored in compression units, and other tabular data for the same table is stored external to compression units, the location of the data that is stored external to compression units is referred to herein as the "overflow area".

In one embodiment, in response to the data in the overflow area exceeding a particular threshold, the overflow data may be automatically moved into one or more new compression units. For example, several DML operations may result in the overflow area having thousands of rows. In response to detecting that the size of the data in the overflow area has exceeded some threshold, the data from the overflow may be repackaged into one or more new compression units. Similar to the bulk load situation, the new top-level compression units that are created to store the data from the overflow area may have the same internal structure as compression.

According to one embodiment, tabular data is deleted, inserted and updated directly into compression units, in response to operations performed on the corresponding table. In the case where the compression unit contains compressed data, performing such operations on the data itself, overhead is incurred due to the need to decompress the data before making the change, and then recompress the data after making the change. In the case where the compression unit contains uncompressed data, no such cost is incurred and the data may be acted upon directly.

5.8. Deleting Tabular Data Stored in Compression Units

In one embodiment, the delete vector in delete vector field 1618 (illustrated in FIG. 16) is used to delete rows from a table without actually deleting, from the compression unit, the data that the rows contain. For example, assume that a particular compression unit stores data for 1000 rows. The corresponding delete vector may include 1000 bits, where the position of the bit indicates the row to which the bit corresponds. If a request is received to delete the $10^{th}$ row from the compression unit, then the $10^{th}$ bit of the delete vector is set to indicate that the corresponding row is deleted. However, the actual data for the $10^{th}$ row is not actually deleted from the compression unit.

Various benefits result from treating deletions in this manner. For example, by using the delete vector, deletions do not incur the overhead associated with decompressing the compressed section of a compression unit (and any lower-level compression units contained therein), because the delete vector is in the uncompressed section of the compression unit.

Further, the decompression overhead is not the only overhead avoided by using the delete vector. Specifically, if the compressed section was decompressed to remove the deleted row, then the compressed section would have to be recompressed after the row data was removed, thereby incurring more overhead. In addition, deletion of data from a compressed set of data may, under some circumstances, increase the compressed size of the data.

In one embodiment, rather than include a delete vector in the header of all compression units, the delete vector is only included at the top-level compression units. Inspection of the top-level delete vector indicates which rows have been deleted without having to access the headers of any lower-level compression units.

According to one embodiment, if the number of rows that are deleted exceeds a particular threshold, then the entire compression unit is rewritten. For example, if the bit vector indicates that more than some threshold percentage of the rows within a compression unit has been deleted, the compression unit may be decompressed, and the not-yet-deleted rows may be stored in a new compression unit. If there are sufficiently few rows remaining the system may store the compression unit in uncompressed form to avoid further overhead decompressing the compression unit. Alternatively, during this process, the data from many compression units may be combined into a new, smaller set of compression units which may be compressed.

5.9. Inserting Tabular Data

According to one embodiment, the insertion of data into a compression unit may be done directly. However, the addition of data into a compressed compression unit could incur significant overhead penalties, due to the decompression and recompression that would be required. Further, the resulting compression unit may be larger than desired. In the case that the compression unit contains data in uncompressed form, and the block contains sufficient space, the data may be inserted directly without such overhead.

According to one embodiment, newly added tabular data is not inserted into existing compression units. Instead, the newly added tabular data is either stored in the overflow area or stored in newly formed compression units which may be compressed or uncompressed depending on the amount of data inserted so far.

In one embodiment, if a small number of rows are being inserted into table 1200, these rows may be stored external to compression units in the overflow area or they may be inserted into an uncompressed compression unit that has space available. If the insertion results in that compression unit exceeding some threshold, the system may compress the data in the compression unit.

In one embodiment, when the amount of data to be inserted into table 1200 exceeds a threshold, then the data is not stored in the overflow area or existing uncompressed compression units. Rather, the new data is stored in new compression units. For example, if a bulk load operation is performed to add thousands of rows to table 1200, then one or more new compression units may be created to store the tabular data for the new rows. According to one embodiment, the new top-level compression units would automatically inherit the same internal structure as compression unit 1100, including the structure and organization of the compression units that descend from compression unit 1100.

5.10. Updating Tabular Data

According to one embodiment, data may be updated directly within a compression unit. However, the addition of data into a compression unit could incur significant overhead penalties, due to the decompression and recompression that would be required. Further, the resulting compression unit may be larger than desired. In the case that the compression unit contains data in uncompressed form, and the block contains sufficient space, the data may be updated directly without such overhead.

According to one embodiment, updates are treated as deletions combined with inserts. Thus, when a value is updated in a row of table 1200, the delete vector in compression unit 1100 is updated to indicate that the row is deleted, and a row with the updated values is stored in the overflow area.

Frequently, there will be some columns of an updated row that are not changed by an update operation. Consequently, prior to storing the updated row in the overflow area, the compressed section of the compression unit (and any child compression units) may have to be decompressed to recover the pre-update values of the row. The new row stored in the overflow area includes the pre-update values of the columns of the row that were not changed, and new values for the columns of the row that were changed.

5.11. Reading Tabular Data

In an embodiment that uses an overflow area, table scans must read both the data that is stored in the overflow area, and the data that is stored in compression units. Thus, a single table scan may involve combining data from several differently organized compression units, from compressed data in the overflow area, and from uncompressed data in the overflow area.

5.12. Example Data Loading Operation

Figure 17:
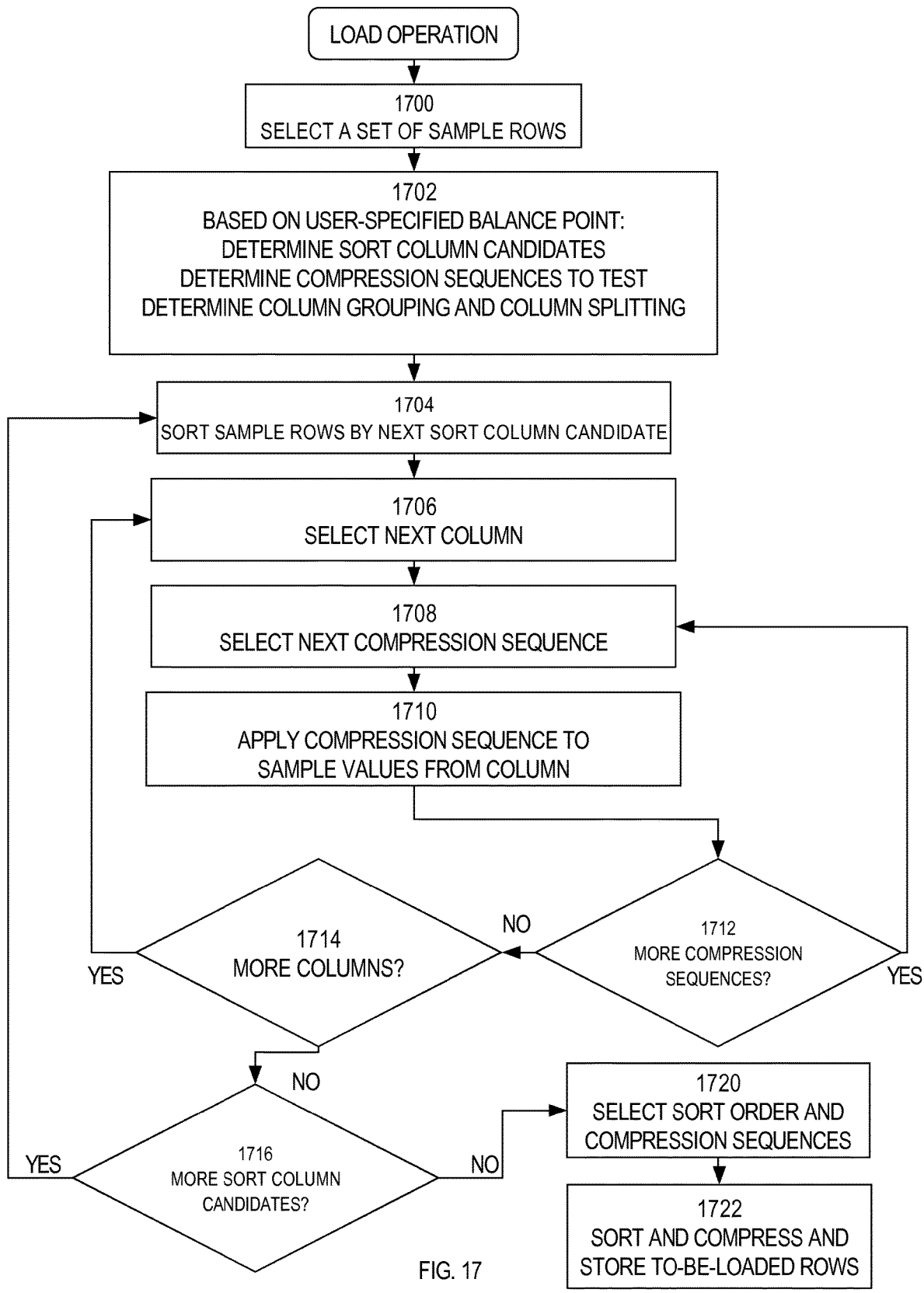
FIG. 17 is a flowchart illustrating steps performed during a load operation, according to an embodiment of the invention.

Referring to FIG. 17, it is a flowchart illustrating steps performed during a load operation, according to an embodiment of the invention. For the purpose of explanation, assume that the load operation involves loading one million rows into table 300 illustrated in FIG. 3, and that table 300 has been created (e.g. by a CREATE TABLE command) but is currently unpopulated.

At step 1700, a set of sample rows is selected from the to-be-loaded rows. The number of rows in the sample may vary from implementation to implementation. In general, the larger the sample, the more likely the sample will accurately represent the values with which table 300 will ultimately be populated (the "future contents" of table 300). The more accurately the sample represents the future contents, the better the compression ratios and performance characteristics produced by the set of sample rows will reflect the compression ratios and performance characteristics that will result when the future contents is compressed.

However, the larger the set of sample rows, the longer it takes to perform compression tests against the sample rows, and the greater the amount computational resources required and consumed by those tests. Therefore, while one embodiment may select all of the to-be-loaded rows as the sample, other embodiments may cap the number of rows selected as the sample. The cap may be based on a percentage of the to-be-loaded rows, based on a specific maximum number of samples, or may be dictated by the amount of resources, such as dynamic memory, that is available on the system on which the tests are to be performed.

At step 1702, the compression analyzer selects the sort column candidates, the compression sequences to test, and the column grouping and column splitting combinations to be tested. In one embodiment, all of these determinations are based on the user-specified balance point. However, in other embodiments, some or all of these determinations may be based on other factors. For example, a user may specify that a certain column should be split, or that certain columns should be compressed together as a column group.

Steps 1704 and 1716 form a loop, where all steps within the loop are performed for each of the sort column candidates. Steps 1706 and 1714 form a loop, within the sort column loop, where all steps within the loop are performed for each column (or sub-column, or column group). Finally, steps 1708 and 1712 form a loop, within the column loop, where all steps within the loop are performed for each compression sequence. At step 1710, the currently selected compression sequence is applied to values, in the sample rows, from the currently selected column. Since step 1710 occurs within the sort column, the column, and the compression sequence loops, step 1710 will cause a test to be run for each compression sequence, on values for each column, for each candidate sort order of the sample rows.

After compression tests have been run on the values within the sample rows for various combinations of sort orders and per-column compression sequences, at step 1720 a sort order is selected for the table, and a compression sequence is selected for each column of the table. In selecting the sort order and compression sequences, the compression analyzer may take into account factors in addition to the compression ratios and performance characteristics produced by tests. For example, if the compression ratios produced by sorting the rows is only slightly better than the compression ratios produced without sorting, then the compression analyzer may choose to not sort prior to compression.

In one embodiment, statistics are maintained for various compression sequences, to track which compression sequences generally perform better in different situations. For example, the statistics may track, for each compression sequence, the characteristics of the columns against which the compression sequence was applied, and what compression ratios were produced. These historical statistics may be used by the compression analyzer to determine which compression sequences are generally better than others for columns that exhibit certain characteristics.

The compression analyzer may then make use of these statistics, along with the compression ratios and performance characteristics actually produced by the tests, when selecting a compression sequence for a particular column. For example, if a first compression sequence produces slightly better compression ratio for the particular column than a second compression sequence, the compression analyzer may still pick the second compression sequence if (a) the second compression sequence has significantly lower overhead and/or (b) based on the statistics, the second compression sequence is known to generally produce better results for columns that have the characteristics of the particular column. In situation (b), selecting the second compression sequence may be preferred because the better compression ratio produced by the first compression sequence may have simply been anomalous.

According to one embodiment, after the sort order and compression sequences are selected at step 1720, a "map" that represents the selections is stored in a dictionary table. The map is stored with data that associates the map with the table (or with a particular partition of the table), so that a database server will be able to account for the compression during subsequent accesses to the table (or partition).

At step 1722, once the sort order and compression sequences have been selected, the to-be-loaded rows are sorted, compressed, and stored. When compression units are used to contain the compressed tabular data, the to-be-stored rows are processed in batches that are based on the size of the compression units. For example, if the compression units hold 8,000 rows, then 8000 to-be-loaded rows are obtained and sorted. Then, each column is compressed using the compression sequence that was automatically selected by the compression analyzer. This process is then repeated for each subsequent batch of 8000 to-be-loaded rows, where each batch populates one top-level compression unit.

In one embodiment, the determinations made during step 1720 may be applied to the to-be-loaded rows for all subsequent load operations. Consequently, the overhead associated with determining the sort order and compression sequences is incurred only once, at the time of the initial load operation. Alternatively, the sort order and compression sequence selection process may be performed on a per-load or per-partition basis, where rows from one load or partition may be compressed differently than rows from other loads or partitions of the same table. While performing the compression technique selection process at each load and/or partition involves additional overhead, the resulting improvements in compression may be worth the overhead in situations where the nature of the tabular data varies significantly over time.

In one embodiment, statistics are used to determine whether to repeat the compression technique selection process prior to a load operation. For example, the compression analyzer may maintain statistics about the values that were used to make the prior compression technique selection (e.g. a particular column stored 10 unique values). If the variation between the statistics about the prior values and statistics from the current sample rows is less then a threshold, then the compression technique selection process is not repeated. Thus, the new rows are compressed using the compression sequences determined during a prior load operation. On the other hand, if the variation between the statistics about the prior values and statistics about the current sample rows exceeds the threshold (e.g. the same column now has thousands of unique values), then the compression technique selection process is repeated.

5.13. Miscellaneous

Techniques are also described hereafter for storing tabular data into compression units, retrieving data from compression units, and updating tabular data in compression units. According to one embodiment, techniques are employed to avoid changing tabular data within existing compression units. For example, deleting tabular data within compression units is avoided by merely tracking deletion requests, without actually deleting the data. As another example, inserting new tabular data into existing compression units is avoided by storing the new data external to the compression units. If the number of deletions exceeds a threshold, and/or the number of new inserts exceeds a threshold, new compression units may be generated. When new compression units are generated, the previously-existing compression units may be discarded to reclaim storage, or retained to allow reconstruction of prior states of the tabular data.

In an embodiment, a method comprises: receiving a set of tabular data; wherein the set of tabular data is divided into a plurality of rows, each of which includes data for a particular set of columns; storing data for a first set of rows, of said plurality of rows, in a first compression unit; storing data for a second set of rows, of said plurality of rows, in a second compression unit; storing data that indicates whether, within said first compression unit, data for said first set of rows is stored in column-major format or in row-major format; wherein the steps of receiving and storing are performed by one or more computing devices.

In an embodiment, within said first compression unit, data for said first set of rows is stored in column-major format; and within said second compression unit, data for said second set of rows is stored in column-major format. In an embodiment, within said first compression unit, data for said first set of rows is stored in column-major format; and within said second compression unit, data for said second set of rows is stored in row-major format. In an embodiment, within said first compression unit, data for said first set of rows is stored in row-major format; and within said second compression unit, data for said second set of rows is stored in row-major format. In an embodiment, the first compression unit has a first compressed section in which data is compressed using a first compression technique; and the second compression unit has a second compressed section in which data is compressed using a second compression technique that is different from the first compression technique.

In an embodiment, a method comprises: receiving a set of tabular data; wherein the set of tabular data is divided into a plurality of rows, each of which includes data for a particular set of columns; storing data for said plurality of rows in a first compression unit; wherein the first compression unit includes a plurality of child compression units, each of which stores data for one or more columns of the particular set of columns; and wherein steps of receiving and storing are performed by one or more computing devices.

In an embodiment, the plurality of child compression units includes: a first child compression unit that has a first compressed section in which data is compressed using a first compression technique; and a second child compression unit that has a second compressed section in which data is compressed using a second compression technique that is different from the first compression technique. In an embodiment, the plurality of child compression units includes a child compression unit that contains a second plurality of child compression units.

In an embodiment, a method comprises: receiving a set of tabular data; wherein the set of tabular data is divided into a plurality of rows, each of which includes data for a particular set of columns; storing data for said plurality of rows in a parent compression unit that includes a plurality of child compression units; wherein the step of storing data in the parent compression unit includes either: (a) dividing the data between the child compression units based on rows, whereby each child compression unit stores a different set of rows of the plurality of rows; or (b) dividing the data between the child compression units based on columns, whereby each child compression unit stores a different set of columns of the particular set of columns; wherein steps of receiving and storing are performed by one or more computing devices.

In an embodiment, the step of storing data in the parent compression unit includes dividing the data between the child compression units based on rows, whereby each child compression unit stores a different set of rows of the plurality of rows. In an embodiment, the step of storing data in the parent compression unit includes dividing the data between the child compression units based on columns, whereby each child compression unit stores a different set of columns of the particular set of columns. In an embodiment, the parent compression unit includes a compressed section and an uncompressed section; the plurality of child compression units are stored in the compressed section of the parent compression unit; and data within the compressed section of the parent compression unit is compressed using a first compression technique. In an embodiment, the plurality of child compression units includes a first child compression unit; the first child compression unit includes a compressed section; and data within the compressed section of the first child compression unit is compressed using a second compression technique that is different from said first compression technique. In an embodiment, the plurality of child compression units includes a second child compression unit; the second child compression unit includes a compressed section; and data within the compressed section of the second child compression unit is compressed using a third compression technique that is different from said first compression technique and said second compression technique. In an embodiment, the plurality of child compression units includes a first child compression unit and a second child compression unit; the first child compression unit includes a compressed section; and data within the compressed section of the first child compression unit is compressed using a first compression technique; the second child compression unit includes a compressed section; and data within the compressed section of the second child compression unit is compressed using a second compression technique that is different from said first compression technique. In an embodiment, the plurality of child compression units includes a first child compression unit and a second child compression unit; data within the first child compression unit is stored in row-major format; and data within the second child compression unit is stored in column-major format. In an embodiment, the parent compression unit includes an uncompressed section and a compressed section; the uncompressed section includes metadata that indicates a compression technique that was used to compress data in the compressed section; and the plurality of child compression units are in the compressed section. In an embodiment, the compressed section includes a map that indicates either (a) how many columns are in each child compression unit, or (b) how many rows are in each child compression unit. In an embodiment, the compressed section includes pointers to where each child compression unit will begin after the compressed section is decompressed. In an embodiment, the parent compression unit includes a flag that indicates that the parent compression unit is not a bottom-level compression unit. In an embodiment, columns are organized in the parent compression unit in a parent column order, and at least one of the plurality of child compression units includes a flag that indicates whether columns in the child compression unit are organized in the same order as the parent column order. In an embodiment, the set of tabular data is tabular data for a table; within the table, the particular set of columns has a first particular order; within the parent compression unit, data for the set of columns is stored in a second particular order that is different than said first particular order; and the parent compression unit includes metadata identifying the second particular order.

In an embodiment, a method comprises storing, within a compression unit, data that logically belongs to a row of a table; wherein at least a portion of the data is compressed; and in response to a request to delete the row from the table, storing data that indicates the row is deleted without deleting the data for the row from the compression unit; wherein the method is performed by one or more computing devices.

In an embodiment, the method further comprises repackaging data from the compression unit into one or more new compression units in response to the number of deleted rows of the compression unit exceeding a threshold. In an embodiment, the method further comprises, in response to a request to store data in the table, storing the data in an overflow area external to the compression unit. In an embodiment, the method further comprises repackaging data from the overflow area into one or more compression units in response to the amount of data in the overflow area exceeding a threshold. In an embodiment, the step of storing data that indicates the row is deleted includes changing a bit, within a delete vector, that corresponds to the row. In an embodiment, the delete vector is stored within an uncompressed section of the compression unit.

6.0. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 10:
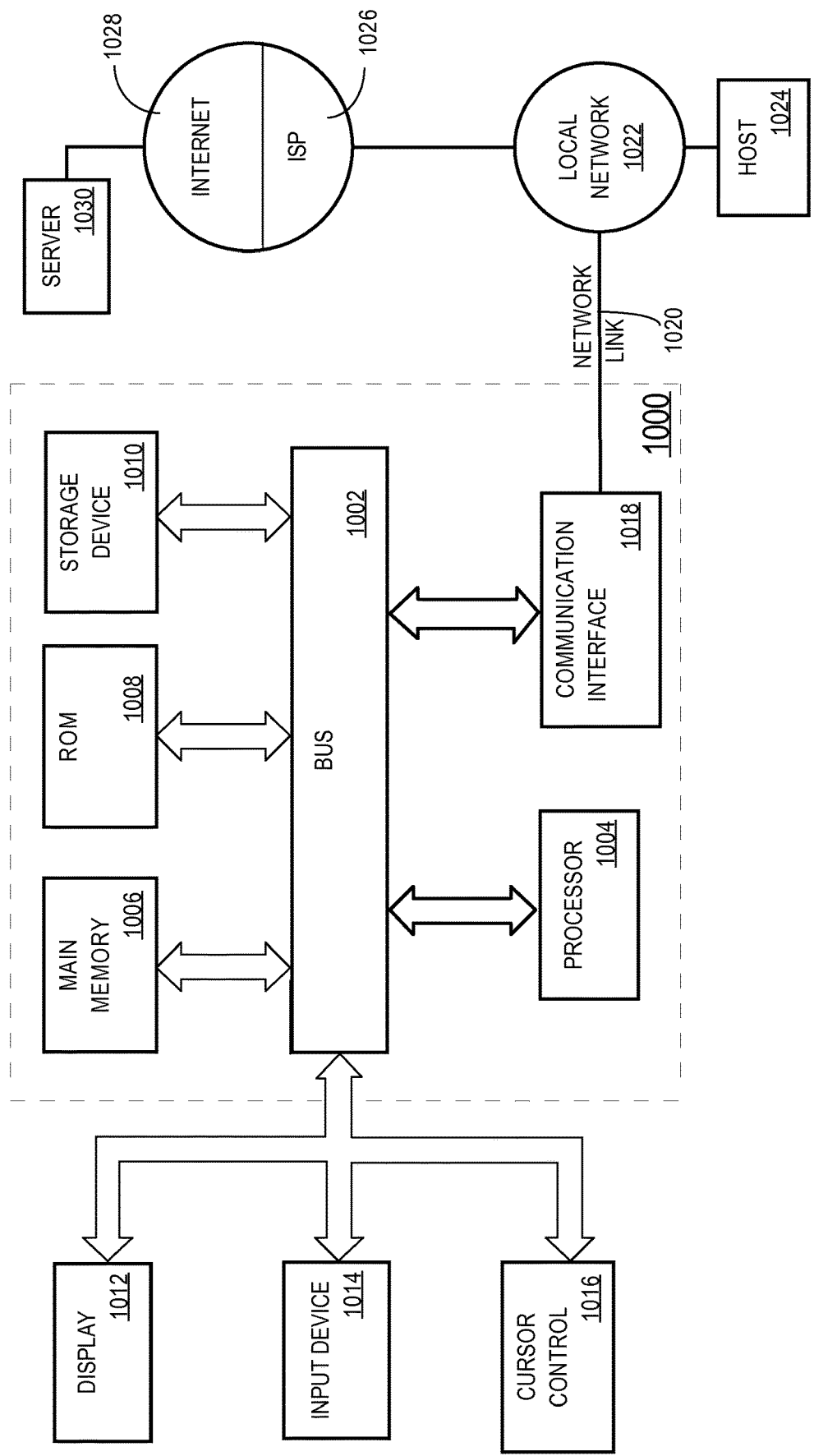
FIG. 10 is a block diagram of a computing device upon which embodiments of the invention may be implemented.

For example, FIG. 10 is a block diagram that illustrates a computer system 1000 upon which an embodiment of the invention may be implemented. Computer system 1000 includes a bus 1002 or other communication mechanism for communicating information, and a hardware processor 1004 coupled with bus 1002 for processing information. Hardware processor 1004 may be, for example, a general purpose microprocessor.

Computer system 1000 also includes a main memory 1006, such as a random access memory (RAM) or other dynamic storage device, coupled to bus 1002 for storing information and instructions to be executed by processor 1004. Main memory 1006 also may be used for storing temporary variables or other intermediate information during execution of instructions to be executed by processor 1004. Such instructions, when stored in storage media accessible to processor 1004, render computer system 1000 into a special-purpose machine that is customized to perform the operations specified in the instructions.

Computer system 1000 further includes a read only memory (ROM) 1008 or other static storage device coupled to bus 1002 for storing static information and instructions for processor 1004. A storage device 1010, such as a magnetic disk or optical disk, is provided and coupled to bus 1002 for storing information and instructions.

Computer system 1000 may be coupled via bus 1002 to a display 1012, such as a cathode ray tube (CRT), for displaying information to a computer user. An input device 1014, including alphanumeric and other keys, is coupled to bus 1002 for communicating information and command selections to processor 1004. Another type of user input device is cursor control 1016, such as a mouse, a trackball, or cursor direction keys for communicating direction information and command selections to processor 1004 and for controlling cursor movement on display 1012. This input device typically has two degrees of freedom in two axes, a first axis (e.g., x) and a second axis (e.g., y), that allows the device to specify positions in a plane.

Computer system 1000 may implement the techniques described herein using customized hard-wired logic, one or more ASICs or FPGAs, firmware and/or program logic which in combination with the computer system causes or programs computer system 1000 to be a special-purpose machine. According to one embodiment, the techniques herein are performed by computer system 1000 in response to processor 1004 executing one or more sequences of one or more instructions contained in main memory 1006. Such instructions may be read into main memory 1006 from another storage medium, such as storage device 1010. Execution of the sequences of instructions contained in main memory 1006 causes processor 1004 to perform the process steps described herein. In alternative embodiments, hard-wired circuitry may be used in place of or in combination with software instructions.

The term "storage media" as used herein refers to any media that store data and/or instructions that cause a machine to operation in a specific fashion. Such storage media may comprise non-volatile media and/or volatile media. Non-volatile media includes, for example, optical or magnetic disks, such as storage device 1010. Volatile media includes dynamic memory, such as main memory 1006. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1002. Transmission media can also take the form of acoustic or light waves, such as those generated during radio-wave and infra-red data communications.

Various forms of media may be involved in carrying one or more sequences of one or more instructions to processor 1004 for execution. For example, the instructions may initially be carried on a magnetic disk or solid state drive of a remote computer. The remote computer can load the instructions into its dynamic memory and send the instructions over a telephone line using a modem. A modem local to computer system 1000 can receive the data on the telephone line and use an infra-red transmitter to convert the data to an infra-red signal. An infra-red detector can receive the data carried in the infra-red signal and appropriate circuitry can place the data on bus 1002. Bus 1002 carries the data to main memory 1006, from which processor 1004 retrieves and executes the instructions. The instructions received by main memory 1006 may optionally be stored on storage device 1010 either before or after execution by processor 1004.

Computer system 1000 also includes a communication interface 1018 coupled to bus 1002. Communication interface 1018 provides a two-way data communication coupling to a network link 1020 that is connected to a local network 1022. For example, communication interface 1018 may be an integrated services digital network (ISDN) card, cable modem, satellite modem, or a modem to provide a data communication connection to a corresponding type of telephone line. As another example, communication interface 1018 may be a local area network (LAN) card to provide a data communication connection to a compatible LAN. Wireless links may also be implemented. In any such implementation, communication interface 1018 sends and receives electrical, electromagnetic or optical signals that carry digital data streams representing various types of information.

Network link 1020 typically provides data communication through one or more networks to other data devices. For example, network link 1020 may provide a connection through local network 1022 to a host computer 1024 or to data equipment operated by an Internet Service Provider (ISP) 1026. ISP 1026 in turn provides data communication services through the world wide packet data communication network now commonly referred to as the "Internet" 1028. Local network 1022 and Internet 1028 both use electrical, electromagnetic or optical signals that carry digital data streams. The signals through the various networks and the signals on network link 1020 and through communication interface 1018, which carry the digital data to and from computer system 1000, are example forms of transmission media.

Computer system 1000 can send messages and receive data, including program code, through the network(s), network link 1020 and communication interface 1018. In the Internet example, a server 1030 might transmit a requested code for an application program through Internet 1028, ISP 1026, local network 1022 and communication interface 1018.

The received code may be executed by processor 1004 as it is received, and/or stored in storage device 1010, or other non-volatile storage for later execution.

7.0. Extensions and Alternatives

In an embodiment, other database structures such as indexes may also be compressed into compression unit and then stored in data blocks. Although most of the examples of this application discuss compression units for tables, many of the described techniques are just as applicable compression units for other structures.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method comprising:
   generating a plurality of compression units in which to store a database table, each particular compression unit of the plurality of compression units storing respective separate table rows from said database table, wherein generating each particular compression unit comprises:
   compressing at least a first column of the respective separate table rows of said each particular compression unit in a column-major format in a first subunit of said each particular compression unit;
   compressing at least a second column of the respective separate table rows of said each particular compression unit in a column-major format in a second subunit of said each particular compression unit;
   storing the plurality of compression units in a plurality of data blocks by, for each particular compression unit of the plurality of compression units, storing said particular compression unit in a data block row chain that spans multiple data blocks of said plurality of data blocks, wherein said data block row chain contains said first column and said second column;
   wherein the method is performed by one or more computing devices.

2. The method of claim 1, wherein the database table is a first database table in a database, wherein the plurality of data blocks are a first set of data blocks within another plurality of data blocks that store the database, wherein the other plurality of data blocks include a second set of data blocks that store, in row major format, uncompressed data for a second database table in the database.

3. The method of claim 1, further comprising:
   receiving a request that requires access to at least a first table row of the database table;
   based on an index entry corresponding to the first table row, determining that the first table row is stored in at least a first data block;
   retrieving the first data block;
   determining that the first data block stores a portion of a first compression unit;
   retrieving a second set of data blocks that store other portions of the first compression unit;
   decompressing the first compression unit;
   further based on the index entry corresponding to the first table row, identifying the first table row within the first compression unit.

4. The method of claim 1, wherein generating each particular compression unit further comprises generating a compression unit header, the compression unit header comprising metadata that indicates how the first column and the second column are compressed.

5. The method of claim 1, wherein the first column and the second column are compressed with different compression schemes.

6. The method of claim 1, further comprising:
   for each particular compression unit of the plurality of compression units: generating a header that at least indicates a number of data blocks in the data block row chain that stores said each particular compression unit;
   storing the header in front of said each particular compression unit in the data block row chain; and
   prefetching one or more data blocks in which said each particular compression unit is stored based on the header.

7. The method of claim 1, further comprising:
   for each particular compression unit of the plurality of compression units, generating metadata that at least indicates a location within said each particular compression unit at which compressed data for the second column begins; and
   responsive to a request for which the first column is not needed, decompressing a particular second subunit of a first compression unit of said plurality of compression units without decompressing a particular first subunit of the first compression unit based on the metadata generated for the first compression unit that at least indicates a location within said first compression unit at which compressed data for the second column begins.

8. The method of claim 1, further comprising:
   for each particular compression unit of the plurality of compression units, generating metadata that at least indicates a location within the particular compression unit at which compressed data for the second column begins;
   responsive to a request for which the first column is not needed, retrieving second data blocks in which a particular second subunit of a first compression unit of said plurality of compression units is stored without retrieving one or more first data blocks in which a particular first subunit of said first compression unit is stored based on the metadata in the first compression unit that at least indicates a location within the first compression unit at which compressed data for the second column begins.

9. The method of claim 1, further comprising:
responsive to a first database request:
retrieving a first set of data blocks in which a first compression unit of the plurality of compression units is stored;
decompressing the first compression unit;
after decompressing the first compression unit:
temporarily storing the first compression unit in a buffer;
servicing a second database request using the first compression unit in the buffer, without re-retrieving the first set of data blocks.

10. The method of claim 1, further comprising:
dividing the database table into groups of rows, each of the groups of rows corresponding to a different one of the plurality of compression units;
dividing each particular compression unit of the plurality of compression units into portions based on a default data block size, so that each portion of said each particular compression unit fits into a different one of the data blocks.

11. One or more non-transitory computer-readable media storing instructions that, when executed by one or more computing devices, cause:
generating a plurality of compression units in which to store a database table, each particular compression unit of the plurality of compression units storing respective separate table rows from said database table, wherein generating each particular compression unit comprises:
compressing at least a first column of the respective separate table rows of said each particular compression unit in a column-major format in a first subunit of said each particular compression unit;
compressing at least a second column of the respective separate table rows of said each particular compression unit in a column-major format in a second subunit of said each particular compression unit;
storing the pluarlity of compression units in a pluarlity of data blocks by, for each particular compression unit of the pluarlity of compression units, storing said particular compression unit in a data block row chain that spans multiple data blocks of said plurality of data blocks, wherein said data block row chain contains said first column and said second column.

12. The one or more non-transitory computer-readable media of claim 11, wherein the database table is a first database table in a database, wherein the plurality of data blocks are a first set of data blocks within another plurality of data blocks that store the database, wherein the other plurality of data blocks include a second set of data blocks that store, in row major format, uncompressed data for a second database table in the database.

13. The one or more non-transitory computer-readable media of claim 11, wherein the instructions, when executed by the one or more computing devices, further cause:
receiving a request that requires access to at least a first table row of the database table;
based on an index entry corresponding to the first table row, determining that the first table row is stored in at least a first data block;
retrieving the first data block;
determining that the first data block stores a portion of a first compression unit;
retrieving a second set of data blocks that store other portions of the first compression unit;
decompressing the first compression unit;
further based on the index entry corresponding to the first table row, identifying the first table row within the first compression unit.

14. The one or more non-transitory computer-readable media of claim 11, wherein generating each particular compression unit further comprises generating a compression unit header, the compression unit header comprising metadata that indicates how the first column and the second column are compressed.

15. The one or more non-transitory computer-readable media of claim 11, wherein the first column and the second column are compressed with different compression schemes.

16. The one or more non-transitory computer-readable media of claim 11, wherein the instructions, when executed by the one or more computing devices, further cause:
for each particular compression unit of the plurality of compression units:
generating a header that at least indicates a number of data blocks in the data block row chain that stores said each particular compression unit;
storing the header in front of said each particular compression unit in the data block row chain; and
prefetching one or more data blocks in which said each particular compression unit is stored based on the header.

17. The one or more non-transitory computer-readable media of claim 11, wherein the instructions, when executed by the one or more computing devices, further cause:
for each particular compression unit of the plurality of compression units, generating metadata that at least indicates a location within said each particular compression unit at which compressed data for the second column begins; and
responsive to a request for which the first column is not needed, decompressing a particular second subunit of a first compression unit of said plurality of compression units without decompressing a particular first subunit of the first compression unit based on the metadata generated for the first compression unit that at least indicates a location within said first compression unit at which compressed data for the second column begins.

18. The one or more non-transitory computer-readable media of claim 11, wherein the instructions, when executed by the one or more computing devices, further cause:
for each particular compression unit of the plurality of compression units, generating metadata that at least indicates a location within the particular compression unit at which compressed data for the second column begins;
responsive to a request for which the first column is not needed, retrieving second data blocks in which a particular second subunit of a first compression unit of said plurality of compression units is stored without retrieving one or more first data blocks in which a particular first subunit of said first compression unit is stored based on the metadata in the first compression unit that at least indicates a location within the first compression unit at which compressed data for the second column begins.

19. The one or more non-transitory computer-readable media of claim 11, wherein the instructions, when executed by the one or more computing devices, further cause:
responsive to a first database request:

retrieving a first set of data blocks in which a first compression unit of the plurality of compression units is stored;

decompressing the first compression unit;

after decompressing the first compression unit:

temporarily storing the first compression unit in a buffer;

servicing a second database request using the first compression unit in the buffer, without re-retrieving the first set of data blocks.

20. The one or more non-transitory computer-readable media of claim 1, wherein the instructions, when executed by the one or more computing devices, further cause:

dividing the database table into groups of rows, each of the groups of rows corresponding to a different one of the plurality of compression units;

dividing each particular compression unit of the plurality of compression units into portions based on a default data block size, so that each portion of said each particular compression unit fits into a different one of the data blocks.

* * * * *

UNITED STATES PATENT AND TRADEMARK OFFICE
CERTIFICATE OF CORRECTION

PATENT NO. : 11,520,743 B2
APPLICATION NO. : 14/079507
DATED : December 6, 2022
INVENTOR(S) : Kapoor et al.

It is certified that error appears in the above-identified patent and that said Letters Patent is hereby corrected as shown below:

On the Title Page

On page 2, Column 2, under Other Publications, Line 30, delete ""Fundatmentals" and insert -- "Fundamentals --, therefor.

On page 2, Column 2, under Other Publications, Line 51, delete "Summary Action" and insert -- Summary --, therefor.

In the Drawings

On sheet 7 of 17, in FIG. 7, under Reference Numeral 710, Line 1, delete "Storedata" and insert -- Store data --, therefor.

In the Specification

In Column 36, Line 25, delete "then" and insert -- than --, therefor.

In the Claims

In Column 43, Line 42, in Claim 11, delete "pluarlity" and insert -- plurality --, therefor.

In Column 43, Line 42, in Claim 11, delete "pluarlity" and insert -- plurality --, therefor.

In Column 43, Line 44, in Claim 11, delete "pluarlity" and insert -- plurality --, therefor.

Signed and Sealed this
Eighth Day of August, 2023

*Katherine Kelly Vidal*
Katherine Kelly Vidal
*Director of the United States Patent and Trademark Office*